US012761626B2

(12) United States Patent
Khurshudov et al.

(10) Patent No.: US 12,761,626 B2
(45) Date of Patent: Oct. 13, 2026

(54) BLENDED IoT DEVICE HEALTH INDEX

(71) Applicant: ROCKWELL AUTOMATION CANADA LTD., Cambridge (CA)

(72) Inventors: Andrei Khurshudov, Niwot, CO (US); Stephen Skory, Boulder, CO (US); Nicholas Roseveare, Longmont, CO (US)

(73) Assignee: Rockwell Automation Canada Ltd., Cambridge (CA)

( * ) Notice: Subject to any disclaimer, the term of this patent is extended or adjusted under 35 U.S.C. 154(b) by 1213 days.

(21) Appl. No.: 15/458,708

(22) Filed: Mar. 14, 2017

(65) Prior Publication Data

US 2018/0211176 A1 Jul. 26, 2018

Related U.S. Application Data

(60) Provisional application No. 62/448,801, filed on Jan. 20, 2017.

(51) Int. Cl.

| | |
|---|---|
| ***G05B 19/406*** | (2006.01) |
| ***H04L 41/06*** | (2022.01) |
| ***H04L 43/00*** | (2022.01) |
| ***H04L 43/0817*** | (2022.01) |
| ***H04L 67/12*** | (2022.01) |

(Continued)

(52) U.S. Cl.

CPC ............ *G05B 19/406* (2013.01); *H04L 43/00* (2013.01); *H04L 67/12* (2013.01); *H04W 4/38* (2018.02); *H04W 4/70* (2018.02); *G05B 2219/25428* (2013.01); *G05B 2219/2614* (2013.01); *G05B 2219/31125* (2013.01); *G06N 20/00* (2019.01); *H04L 41/06* (2013.01); *H04L 43/0817* (2013.01)

(58) Field of Classification Search

CPC ........ G05B 19/406; G05B 2219/25428; G05B 2219/2614; G05B 2219/31125; H04W 4/38; H04W 4/70; H04L 43/00; H04L 67/12; H04L 41/06; H04L 43/0817; G06N 20/00

See application file for complete search history.

(56) References Cited

U.S. PATENT DOCUMENTS

| | | | |
|---|---|---|---|
| 5,720,003 | A | 2/1998 | Chiang et al. |
| 6,643,569 | B2 | 11/2003 | Miller et al. |

(Continued)

OTHER PUBLICATIONS

Li ("PRESTO: Feedback-Driven Data Management in Sensor Networks") IEEE/ACM Transactions on Networking, vol. 17, No. 4, Aug. 2009 (Year: 2009).*

(Continued)

*Primary Examiner* — Usmaan Saeed
*Assistant Examiner* — Su-Ting Chuang
(74) *Attorney, Agent, or Firm* — Foley & Lardner LLP

(57) ABSTRACT

A method is provided for a device not having an available history of either failures or degraded performance. The method includes establishing, by a computer coupled to the device, an initial baseline of sensor data from the device, receiving new sensor data after establishing the initial baseline, creating an updated baseline based on the new sensor data, evaluating, by the computer, the new sensor data compared to the updated baseline based on a plurality of different time scales, and determining whether the device is indicating an increased probability of failure or degraded performance based on the evaluated sensor data.

20 Claims, 14 Drawing Sheets

*Time Scales for Statistical Comparison of Current vs. Historical Anomaly Counts*

(51) Int. Cl.

| | |
|---|---|
| ***H04W 4/38*** | (2018.01) |
| ***H04W 4/70*** | (2018.01) |
| *G06N 20/00* | (2019.01) |

(56) References Cited

U.S. PATENT DOCUMENTS

| | | | | |
|---|---|---|---|---|
| 7,240,250 | B2 | 7/2007 | Lea et al. | |
| 7,346,593 | B2 * | 3/2008 | Takeuchi | G06F 17/18 706/12 |
| 7,421,414 | B2 | 9/2008 | Liu et al. | |
| 7,840,332 | B2 | 11/2010 | Saravanapriyan et al. | |
| 7,849,227 | B2 * | 12/2010 | Kashiyama | G06F 16/2455 710/1 |
| 7,945,524 | B2 | 5/2011 | Anderson et al. | |
| 7,991,881 | B2 | 8/2011 | Qian et al. | |
| 8,019,501 | B2 | 9/2011 | Breed | |
| 8,068,727 | B2 | 11/2011 | Phillips et al. | |
| 8,244,862 | B2 | 8/2012 | Qian et al. | |
| 8,725,667 | B2 | 5/2014 | Kaushal et al. | |
| 9,191,289 | B2 | 11/2015 | Zhang | |
| 9,542,296 | B1 | 1/2017 | Engers et al. | |
| 10,102,056 | B1 * | 10/2018 | Goldberg | G06F 11/0787 |
| 2005/0278703 | A1 * | 12/2005 | Lo | G06F 11/0751 717/126 |
| 2008/0232682 | A1 | 9/2008 | Eswaran | |
| 2010/0030544 | A1 * | 2/2010 | Gopalan | H04L 47/127 703/13 |
| 2011/0004419 | A1 | 1/2011 | Ue et al. | |
| 2012/0290266 | A1 * | 11/2012 | Jain | G16H 50/20 702/187 |
| 2013/0054213 | A1 | 2/2013 | Rohm, III et al. | |
| 2014/0222813 | A1 | 8/2014 | Yang et al. | |
| 2014/0359035 | A1 | 12/2014 | Wang et al. | |
| 2015/0074023 | A1 | 3/2015 | Gu et al. | |
| 2016/0164902 | A1 * | 6/2016 | Moore | H04L 63/1433 726/25 |
| 2016/0197999 | A1 * | 7/2016 | Chun | H04L 67/2804 709/217 |
| 2016/0358106 | A1 * | 12/2016 | Anderson | G06N 3/08 |
| 2017/0083386 | A1 * | 3/2017 | Wing | G06F 1/30 |

OTHER PUBLICATIONS

Pena ("Anomaly detection using digital signature of network segment with adaptive ARIMA model and Paraconsistent Logic") 2014 IEEE Symposium on Computers and Communications (ISCC) (Year: 2014).*

Mullarkey ("Discovering anomalous behavior in large networked systems") 12th IFIP/IEEE International Symposium on Integrated Network Management (IM 2011) and Workshops (Year: 2011).*

Plessis ("Unsupervised multi scale anomaly detection in streams of events") 2016 10th International Conference on Signal Processing and Communication Systems (ICSPCS) (Year: 2016).*

Martínez ("Experience performing infrared thermography in the maintenance of a distribution utility") 19th International Conference on Electricity Distribution Vienna, May 21-24, 2007 (Year: 2007).*

Tan ("Adaptive System Anomaly Prediction for Large-Scale Hosting Infrastructures") PODC'10, Jul. 25-28, 2010, Zurich, Switzerland (Year: 2010).*

Zheng ("On Development and Performance Evaluation of Some Biosurveillance Methods") Dissertation submitted to the Faculty of the Virginia Polytechnic Institute and State University Jul. 5, 2011 (Year: 2011).*

* cited by examiner

*Fig. 1 IoT Device Health Evaluation System*
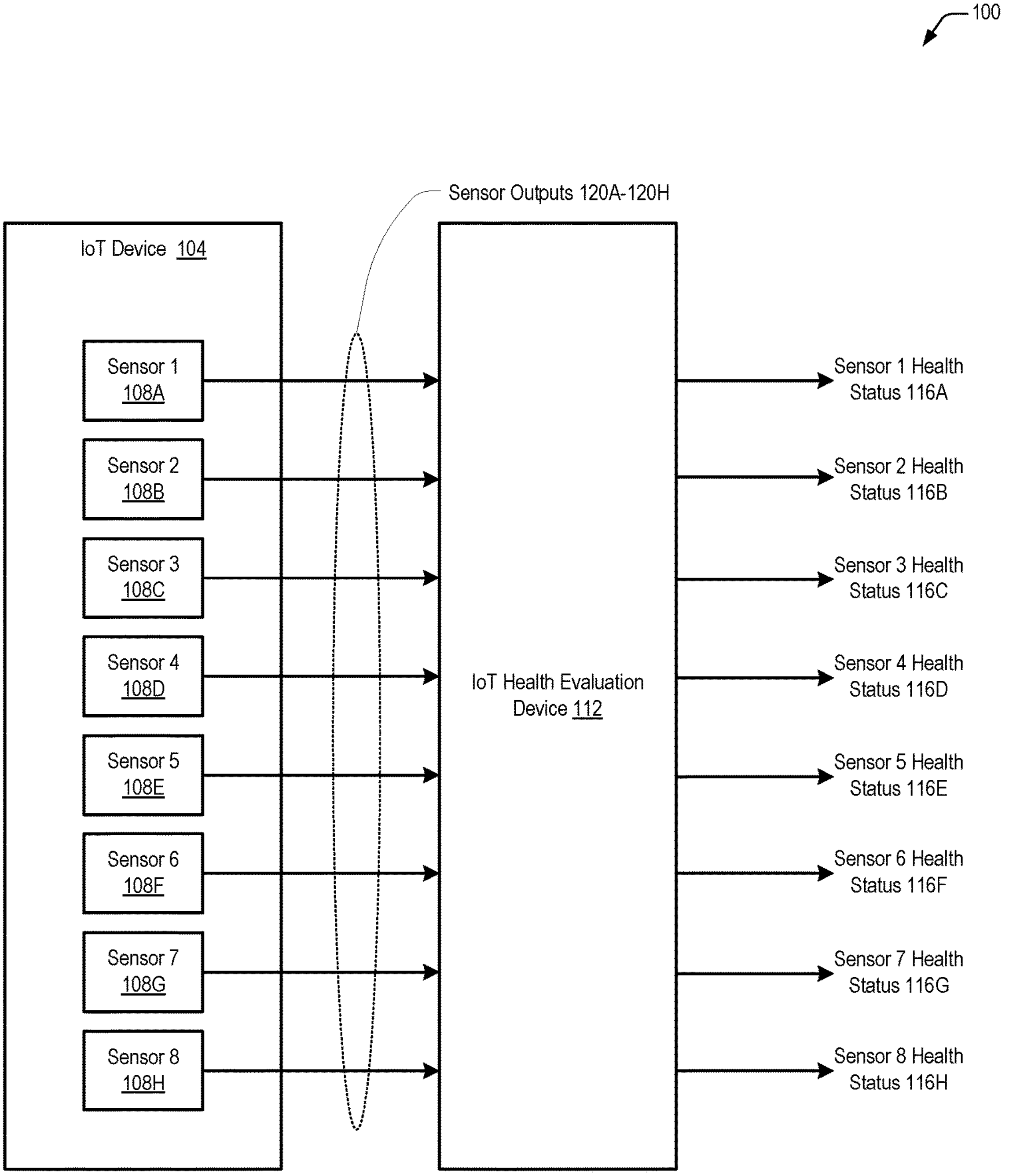

*Fig. 2 IoT Device Health Evaluation System*
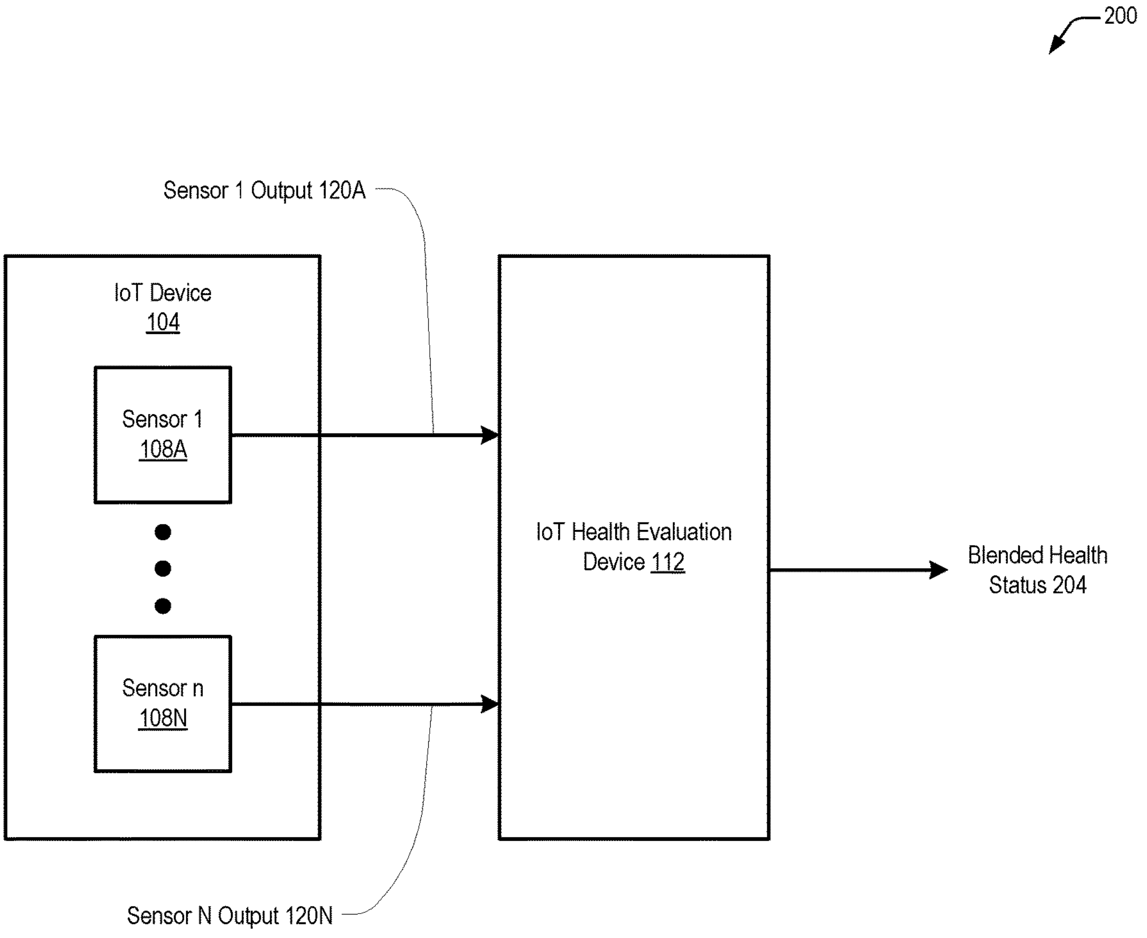

*Fig. 3 IoT Device Health Evaluation System*
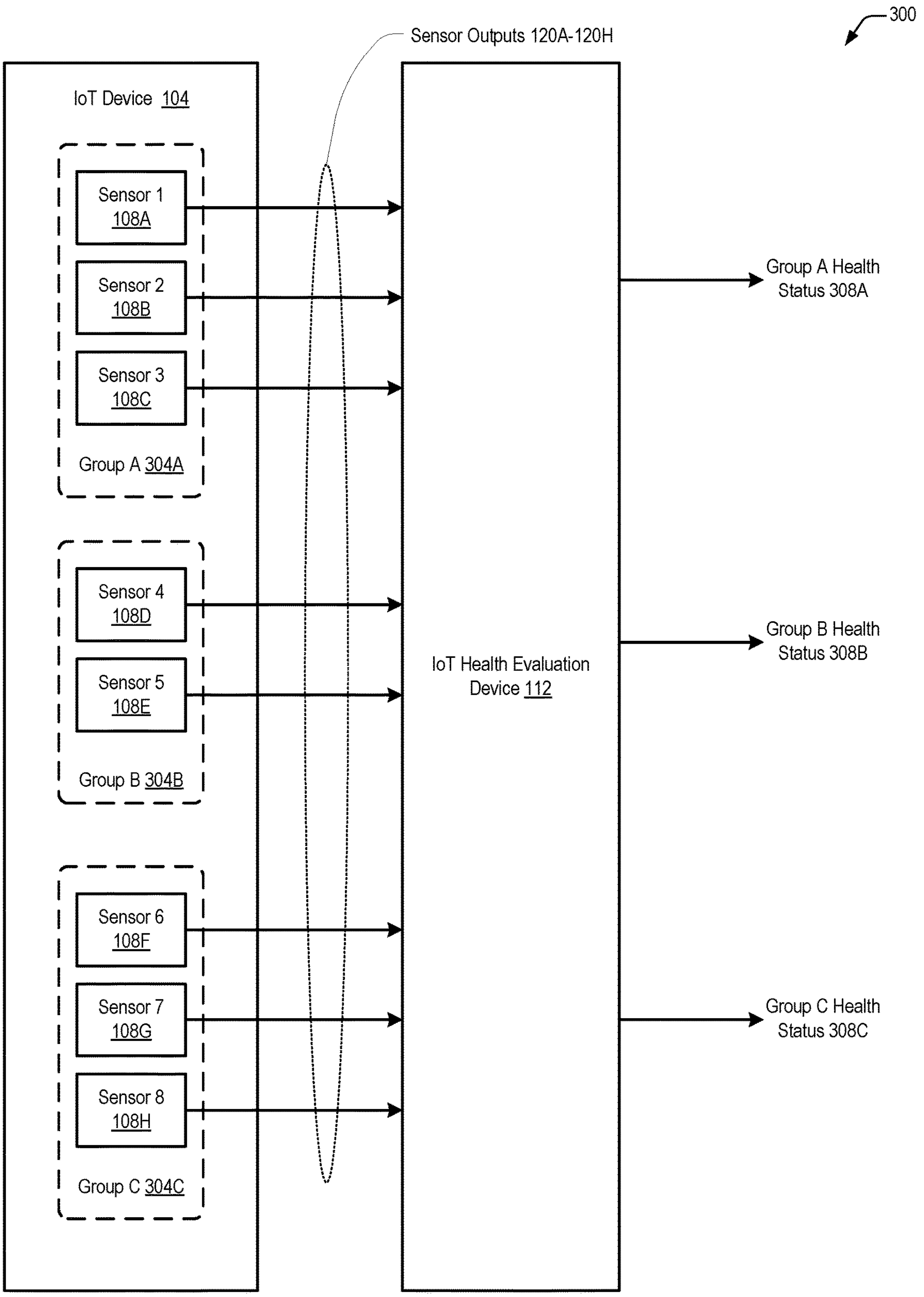

*Fig. 4 IoT Health Evaluation Device Block Diagram*
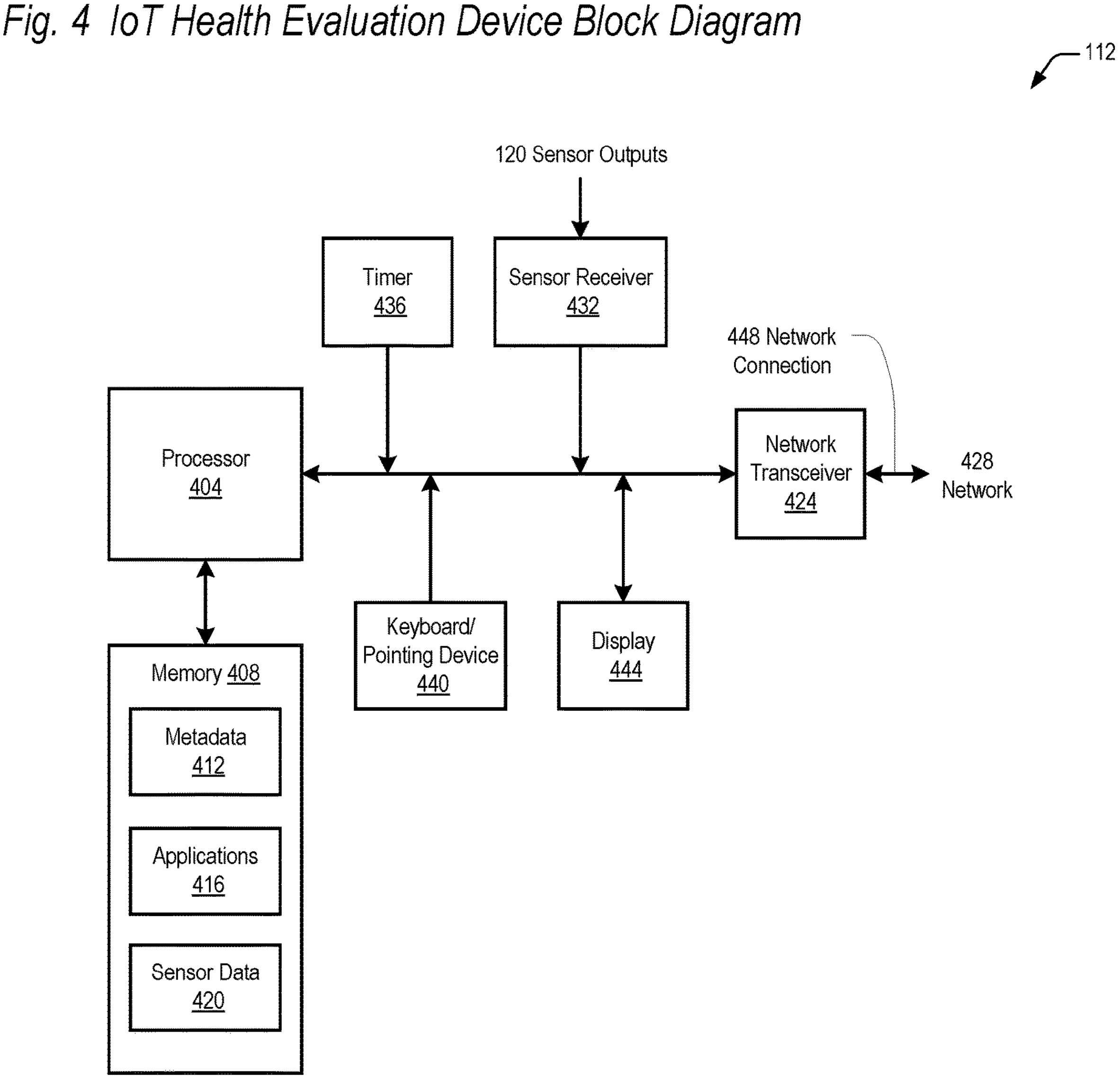

*Fig. 5 Sensor Data Logging*
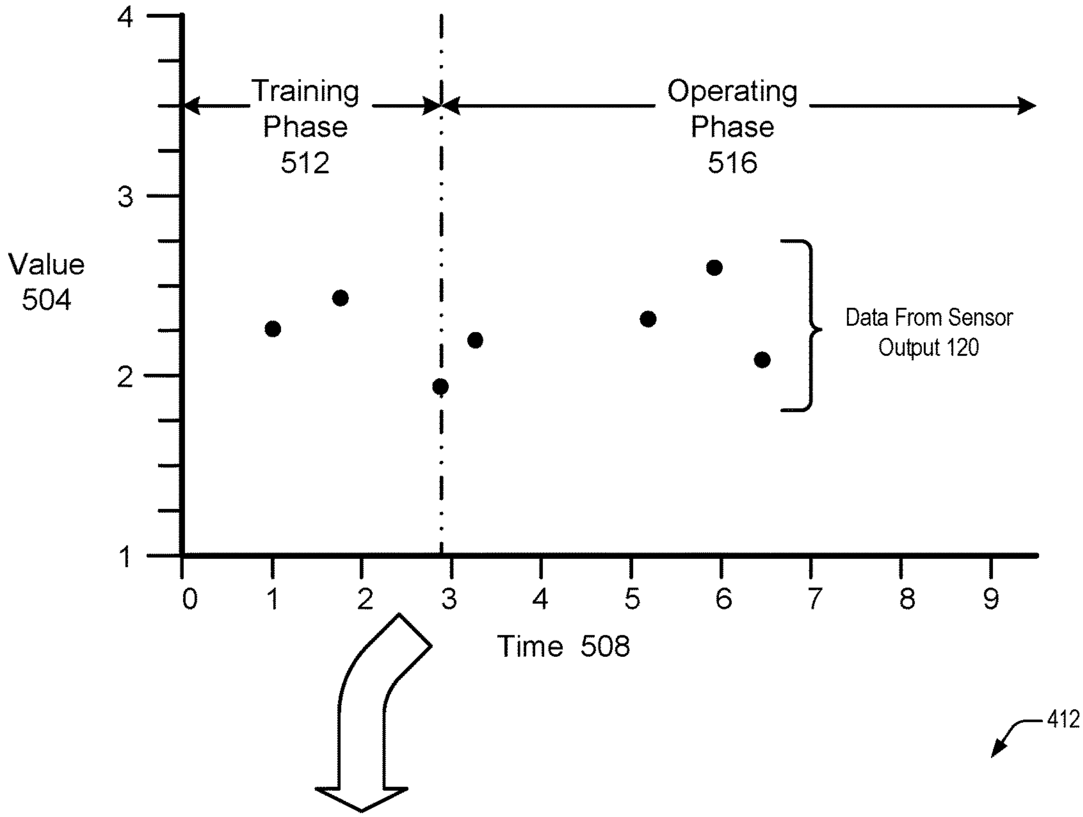
412
| Device ID 524 | Sensor ID 528 | Value 504 | Timestamp 508 | |
|---|---|---|---|---|
| 1 | 1 | 2.25 | 1.0 | Calculate initial baseline from at least the initial 3 Data Points 532 |
| 1 | 1 | 2.4 | 1.75 | |
| 1 | 1 | 1.85 | 2.9 | |
| 1 | 1 | 2.2 | 3.25 | Op. Phase Data Point 1 536 |
| 1 | 1 | 2.33 | 5.21 | Op. Phase Data Point 2 540 |
| 1 | 1 | 2.6 | 5.9 | Op. Phase Data Point 3 544 |
| 1 | 1 | 2.1 | 6.45 | Op. Phase Data Point 4 548 |
•
•
•

*Fig. 6 Anomaly Detection Example Using Statistical Outlier Discovery*
412
| Mean 604 | 3 Sigma 608 | +3 Sigma 612 | - 3 Sigma 616 | |
|---|---|---|---|---|
| 2.17 | .70 | 2.87 | 1.47 | Initial Baseline 532 |
| 2.18 | .60 | 2.68 | 1.58 | Op. Phase Data Point 1 536 |
| 2.21 | .57 | 2.78 | 1.64 | Op. Phase Data Point 2 540 |
| 2.27 | .68 | 2.95 | 1.59 | Op. Phase Data Point 3 544 |
| 2.25 | .66 | 2.91 | 1.59 | Op. Phase Data Point 4 548 |
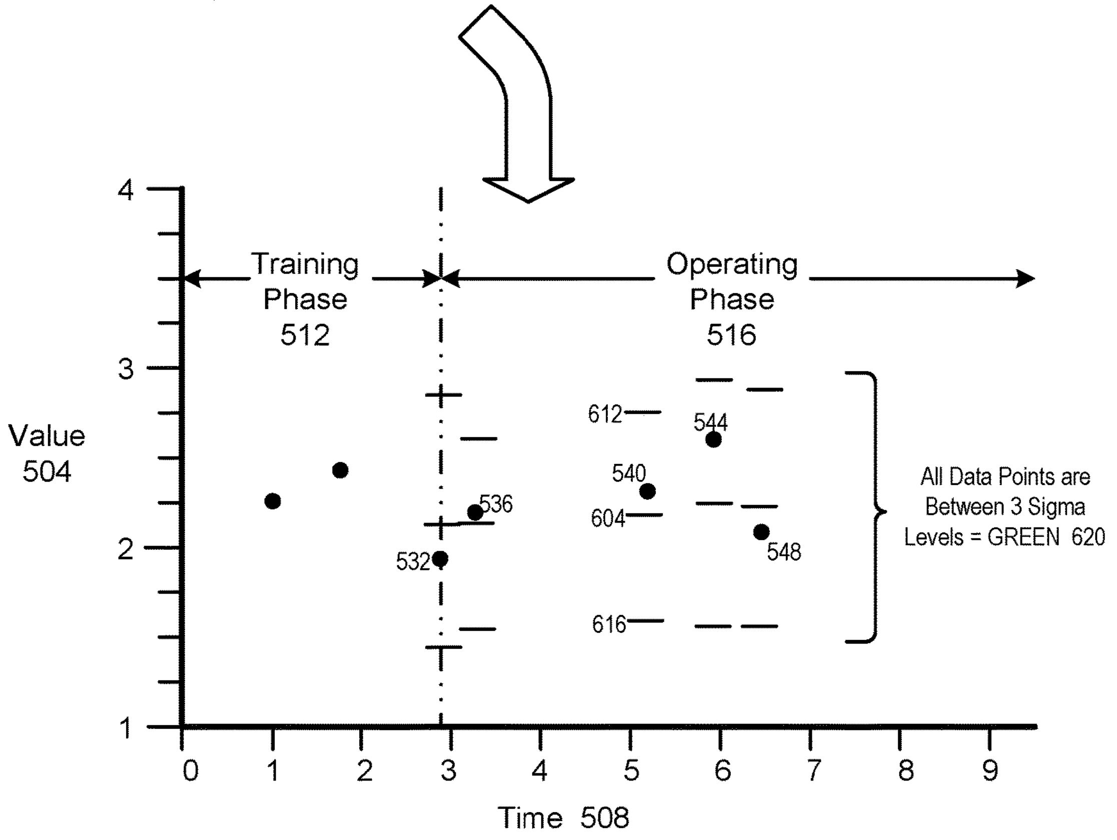

*Fig. 7 Anomaly Detection Example Using Normal, Anomalous, and Failure Instances*
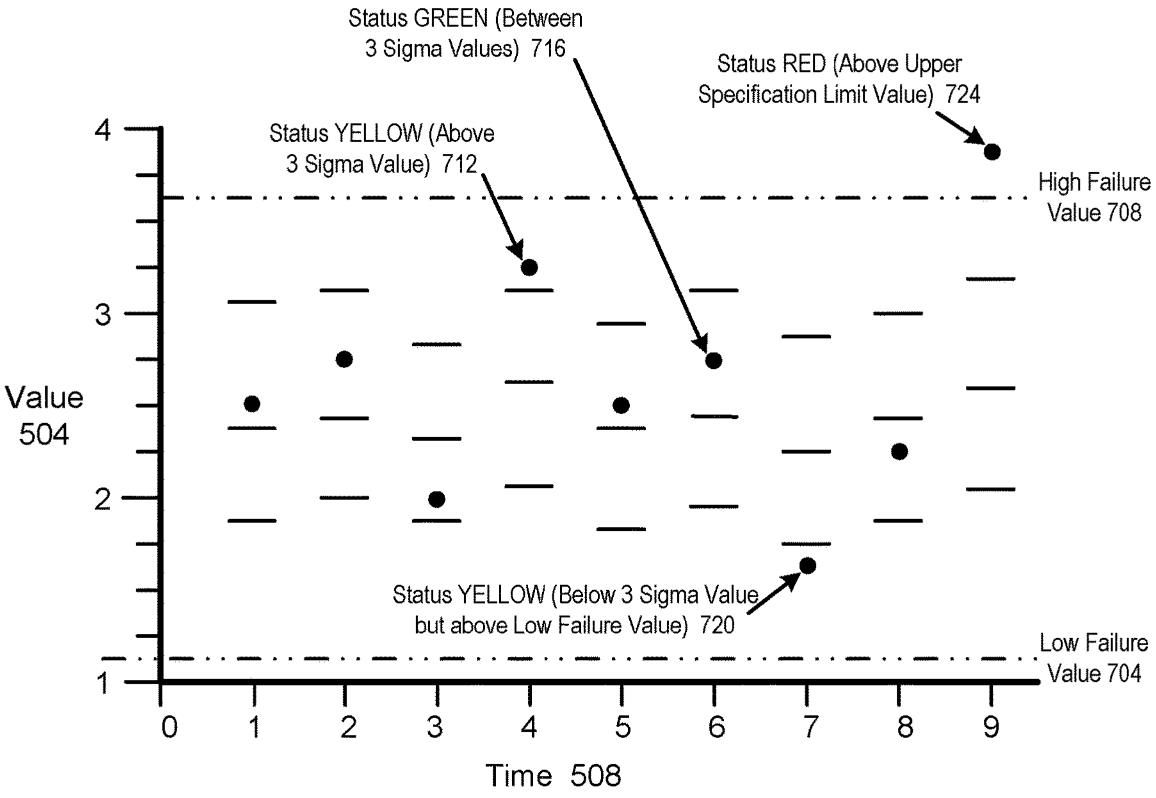

*Fig. 8A Time Scales for Statistical Comparison of Current vs. Historical Anomaly Counts*
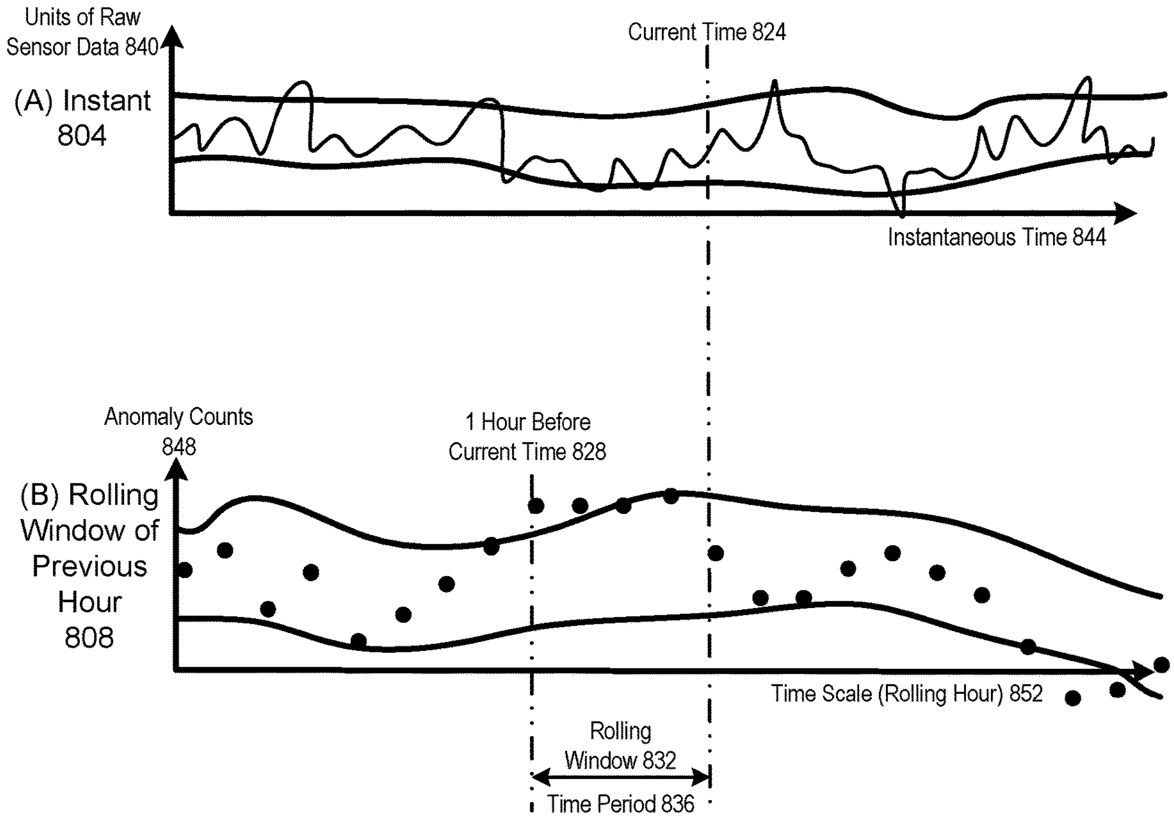

*Fig. 8B Time Scales for Statistical Comparison of Current vs. Historical Anomaly Counts*
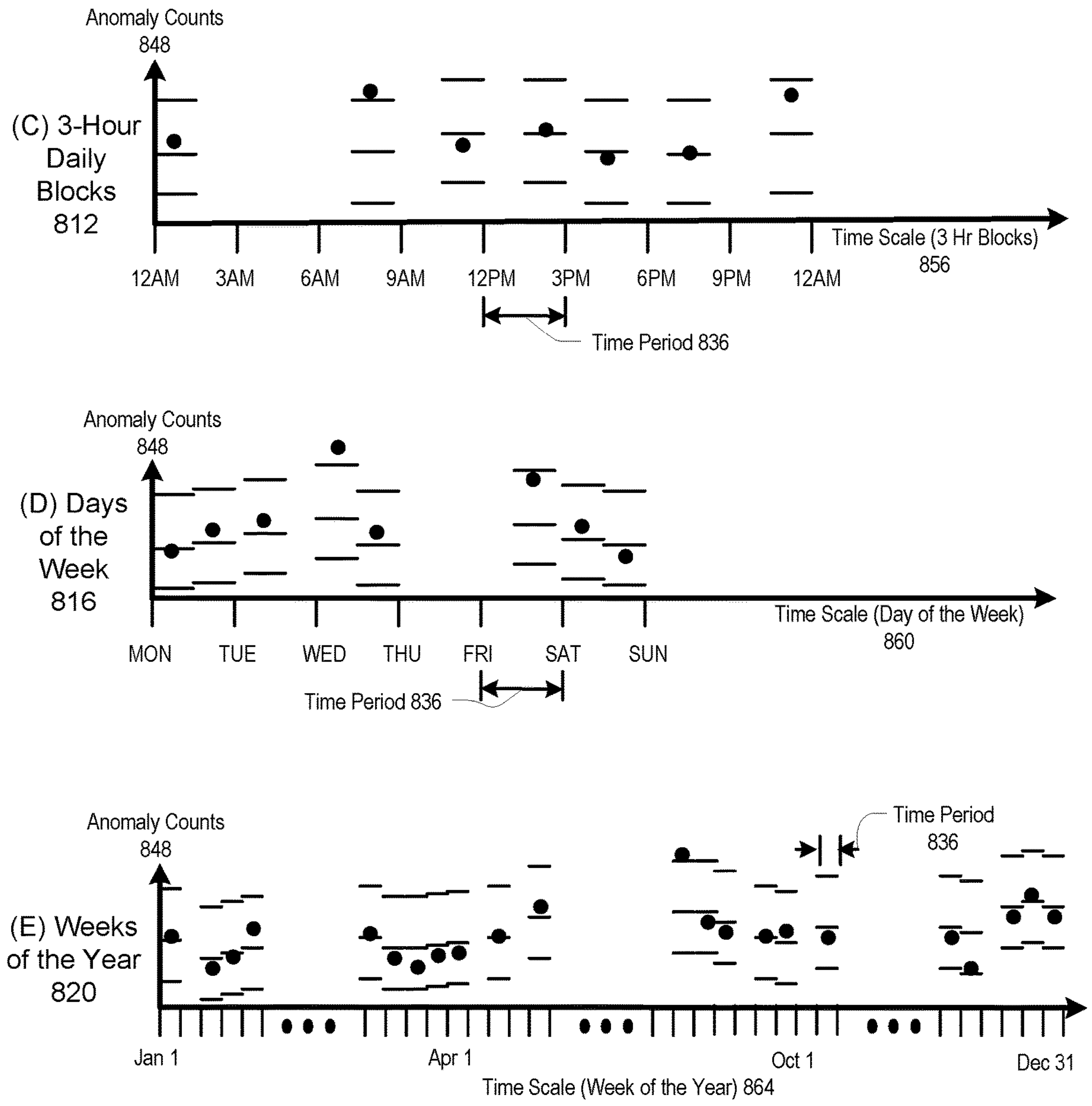

*Fig. 9 Configuration Process*
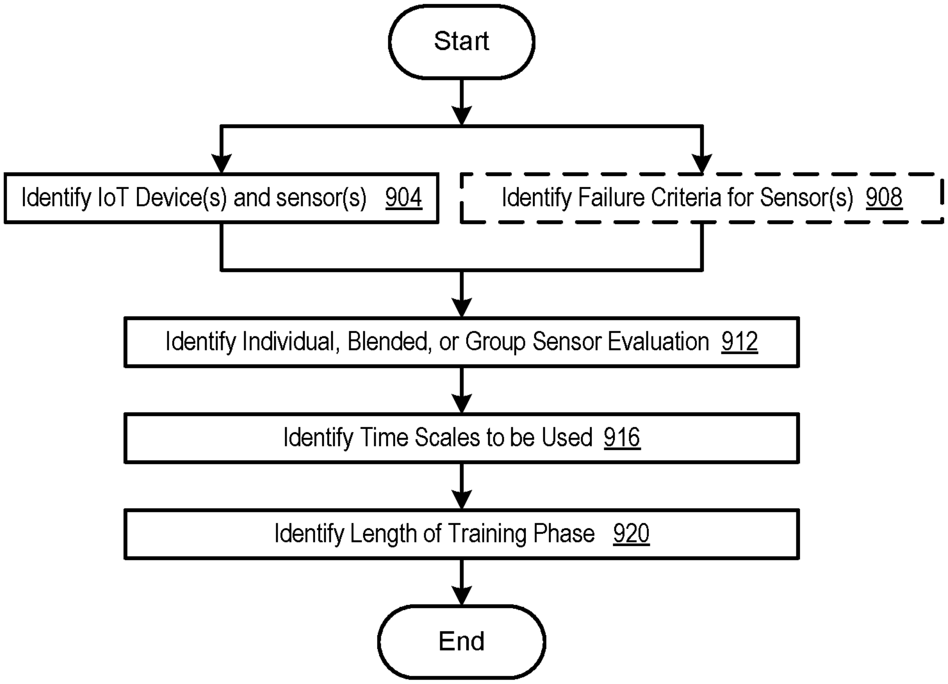

*Fig. 10 Training Phase (for Anomalous Counts, per Time Scale)*
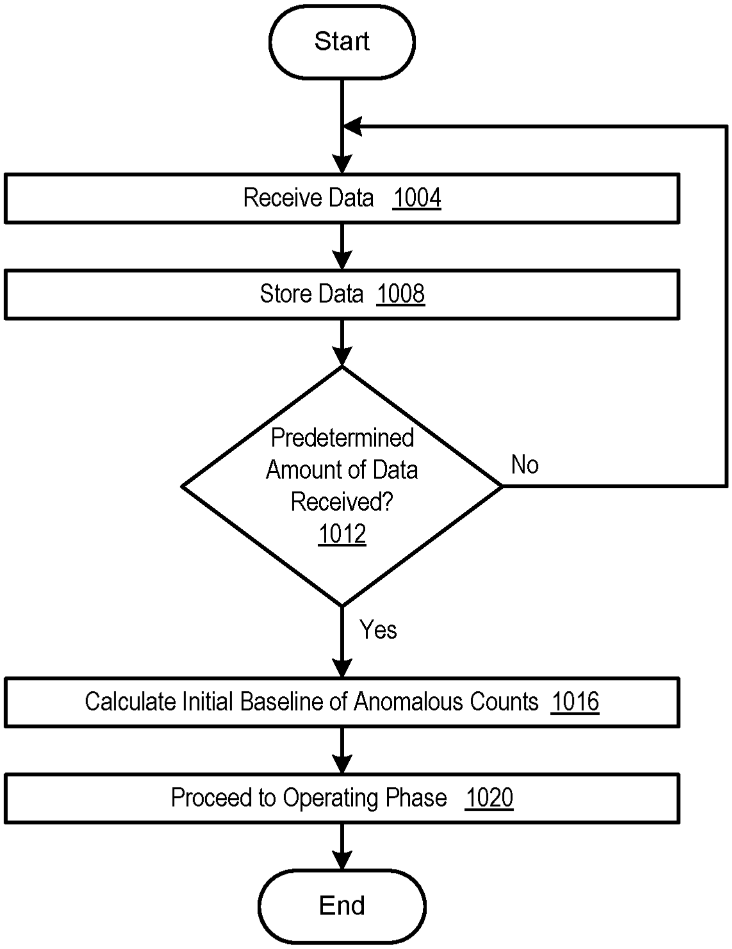

*Fig. 11 Operating Phase*
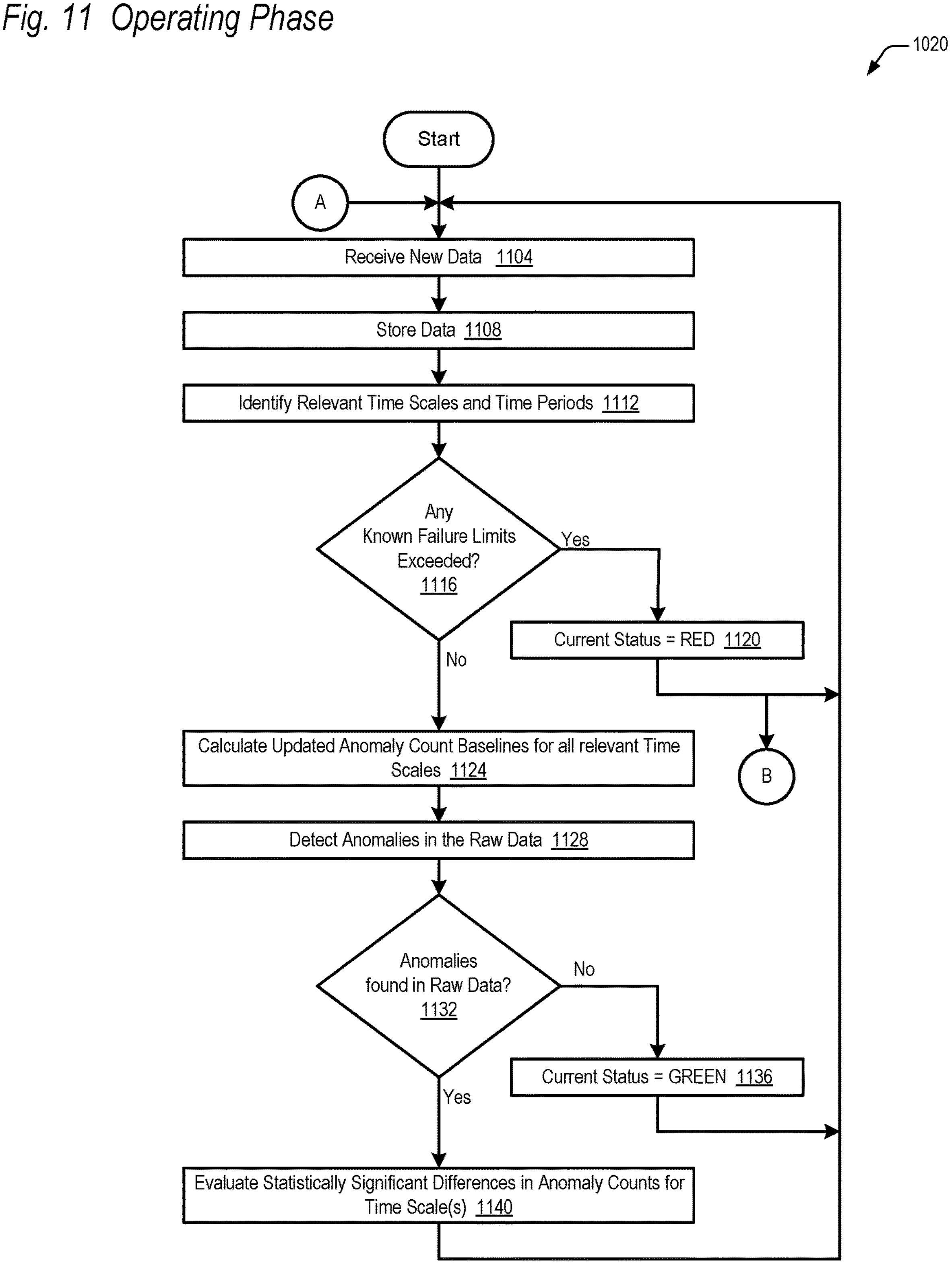

*Fig. 12 Evaluate Time Scales and Time Periods Process*
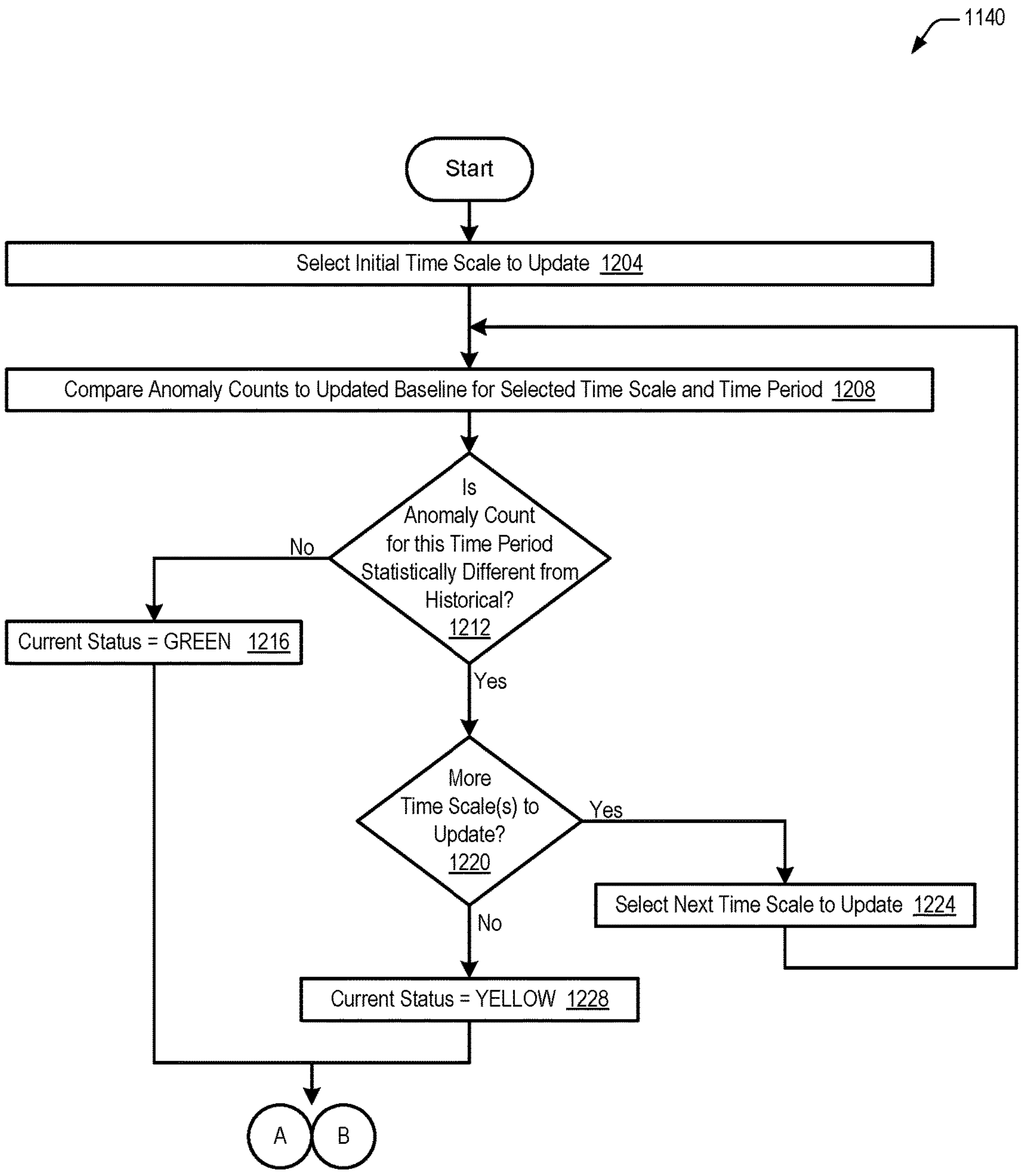

*Fig. 13 Blended Device Health*
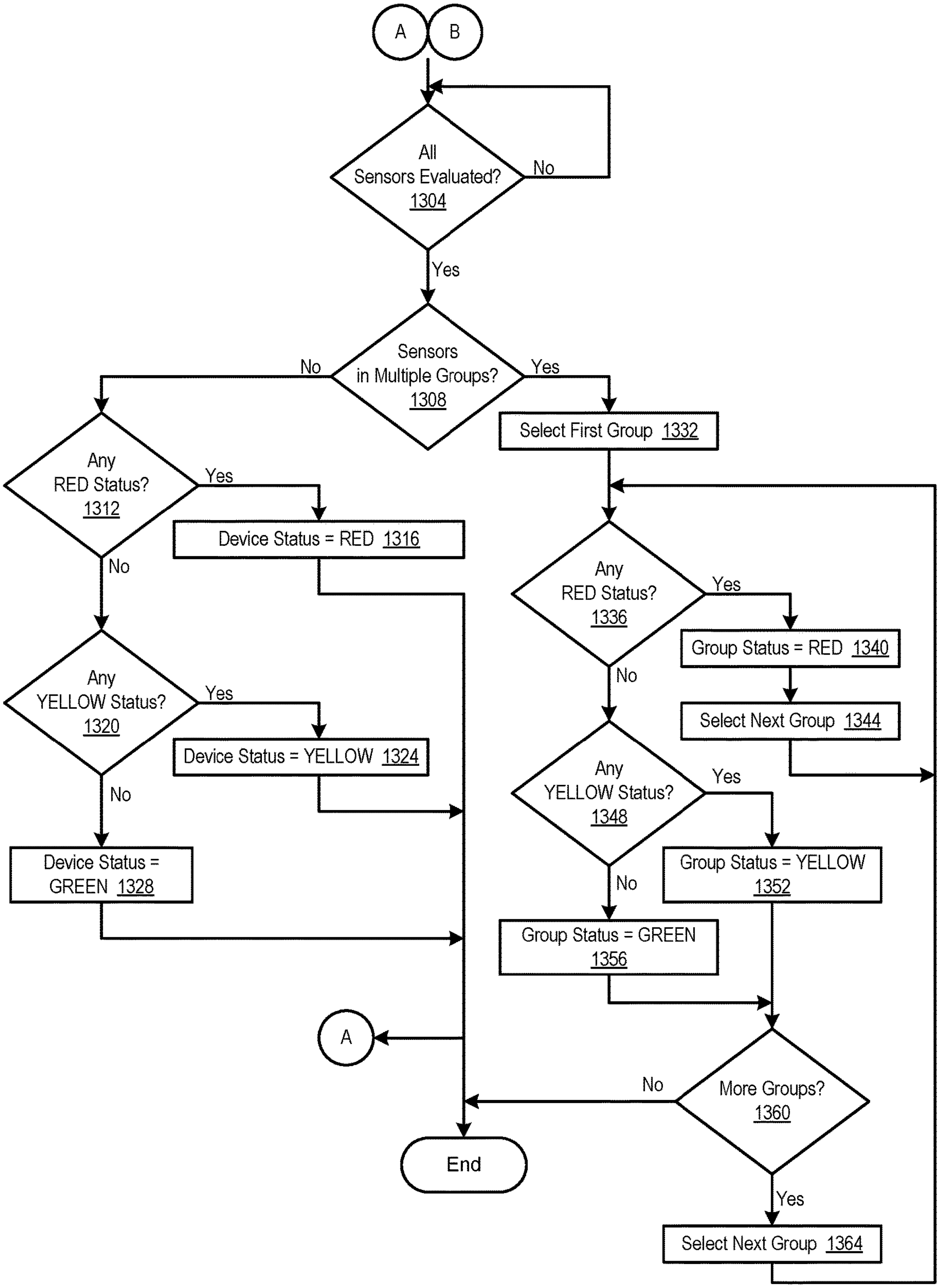

BLENDED IoT DEVICE HEALTH INDEX

CROSS REFERENCE TO RELATED APPLICATIONS

This application claims priority to earlier filed provisional application No. 62/448,801 filed Jan. 20, 2017 and entitled "TOT HEALTH MONITORING USING BLENDED HEALTH INDEX", the entire contents of which are hereby incorporated by reference.

FIELD

The present invention is directed to methods and systems for performance monitoring and failure prediction. In particular, the present invention is directed to methods and systems for detecting and predicting Internet of Things device anomalous behavior or failure when a history of performance of the device may not be available.

BACKGROUND

The Internet of Things (IoT) is a global network of connected physical and virtual objects that enables these objects to collect and exchange information and control each other. With the changing scope of applications of the internet shifting towards making the physical world smarter there is no doubt that a shift is occurring in the number of connected devices. Within 5 years it is estimated that 50 billion devices will be online. PCs, laptops and smart devices which dominate the internet at present will be dwarfed in number by these physical objects. The prerequisites of Internet of Things are many, although the main components can be categorized into three categories i.e. intelligence, sensing and communication.

Broadband Internet is become more widely available, the cost of connecting is decreasing, more devices are being created with Wi-Fi capabilities and sensors built into them, technology costs are going down, and smartphone penetration is skyrocketing. All of these things are creating a "perfect storm" for the IoT. The Internet of Things refers to the connectivity and inter-connectivity of devices, objects, people and places. Many of these new "things" which never used to have any intelligence, now communicate via a network using a variety of protocols (I-P, RFID, NFC, ZigBee, etc.). In some instances these "things" also communicate with applications, people and one another.

The growth of IoT devices will have important implications for people and businesses. Homes and consumers will acquire more devices that need support. Businesses and those providing managed services/maintenance and tech support will need to have more ways to support their customers. More devices added to networks adds more convenience to daily lives but can also cause many new problems. Also, connected devices have more intelligence than ordinary objects. This means they need support, maintenance and troubleshooting. At the same time, most consumers still have a "this should work" mentality. This means competing for consumer spending on maintenance and support—is difficult, but necessary.

More connected devices bring about greater concerns over security, data and privacy. The network will become central to a business or home's safety and security because more IoT devices will depend on it to do their job. Given the lack of IoT device standards at this point, most devices do not communicate with one another. They are designed to be self contained and separate and therefore each have their own procedure and system for troubleshooting and support.

SUMMARY

The present invention is directed to solving disadvantages of the prior art. In accordance with embodiments of the present invention, a method is provided for a device not having an available history of either failures or degraded performance. The method includes establishing, by a computer coupled to the device, an initial baseline of sensor data from the device, receiving new sensor data after establishing the initial baseline, creating an updated baseline based on the new sensor data, evaluating, by the computer, the new sensor data compared to the updated baseline based on a plurality of different time scales, and determining whether the device is indicating an increased probability of failure or degraded performance based on the evaluated sensor data.

In accordance with other embodiments of the present invention, a non-transitory computer readable storage medium is provided. The non-transitory computer readable storage medium is configured to store instructions that when executed cause a processor to perform establishing an initial baseline of sensor data from a device, receiving new sensor data after establishing the initial baseline, creating an updated baseline based on the new sensor data, evaluating, the new sensor data compared to the updated baseline based on a plurality of different time scales, and determining whether the device is indicating an increased probability of failure or degraded performance based on the evaluated sensor data. A history of either device failures or device degraded performance may not be available prior to establishing the initial baseline.

In accordance with still other embodiments of the present invention, a system is provided. The system includes a device, which includes one or more of a sensor configured to provide sensor data, and a server, coupled to the device and not having access to a history of the sensor data. The server is configured to establish an initial baseline of the sensor data, receive new sensor data after establishing the initial baseline, create an updated baseline based on the new sensor data, evaluate the new sensor data compared to the updated baseline based on a plurality of different time scales, and determine whether the device is indicating an increased probability of failure or degraded performance based on the evaluated sensor data.

One advantage of the present invention is that it provides methods for determining a higher likelihood of failure or degraded performance for an Internet of Things device where a history of failures or performance may not be available. An initial baseline of performance is established by monitoring available sensors, updated as new sensor data is received, and processed for anomalies.

Another advantage of the present invention is allows a blended health index to be determined for an IoT device based on one or more groups of sensors. Sensors may be grouped or organized based on the type of data that sensors produce, and each group of sensors may produce a unique result. A blended health index may either be determined from a group of sensors or multiple groups of sensors.

Additional features and advantages of embodiments of the present invention will become more readily apparent from the following description, particularly when taken together with the accompanying drawings. This overview is provided to introduce a selection of concepts in a simplified form that are further described below in the Detailed Description. It may be understood that this overview is not intended to identify key features or essential features of the claimed subject matter, nor is it intended to be used to limit the scope of the claimed subject matter.

BRIEF DESCRIPTION OF THE DRAWINGS

FIG. 1 is a block diagram illustrating components of an IoT Device Health Evaluation System in accordance with a first embodiment of the present invention.

FIG. 2 is a block diagram illustrating components of an IoT Device Health Evaluation System in accordance with a second embodiment of the present invention.

FIG. 3 is a block diagram illustrating components of an IoT Device Health Evaluation System in accordance with a third embodiment of the present invention.

FIG. 4 is a block diagram illustrating components of an IoT Health Evaluation Device in accordance with embodiments of the present invention.

FIG. 5 is a diagram illustrating Sensor Data Logging in accordance with exemplary embodiments of the present invention.

FIG. 6 is a diagram illustrating an Anomaly Detection Example Using Statistical Outlier Discovery in accordance with embodiments of the present invention.

FIG. 7 is a diagram illustrating an Anomaly Detection Example Using Normal, Anomalous, and Failure Instances in accordance with embodiments of the present invention.

FIG. 8A is a diagram illustrating Time Scales for Statistical Comparison of Current Anomaly Counts vs. Historical Anomaly Counts in accordance with embodiments of the present invention.

FIG. 8B is a diagram illustrating Time Scales for Statistical Comparison of Current Anomaly Counts vs. Historical Anomaly Counts in accordance with embodiments of the present invention.

FIG. 9 is a flowchart illustrating a Configuration process in accordance with embodiments of the present invention.

FIG. 10 is a flowchart illustrating a Per-Time Scale Training Phase process for Anomalous Counts in accordance with embodiments of the present invention.

FIG. 11 is a flowchart illustrating an Operating Phase process in accordance with embodiments of the present invention.

FIG. 12 is a flowchart illustrating an Evaluate Time Scales and Time Periods process in accordance with embodiments of the present invention.

FIG. 13 is a flowchart illustrating a Blended Device Health process in accordance with embodiments of the present invention.

DETAILED DESCRIPTION

Typical IoT devices send sensor data out on a periodic basis and receive control commands and/or other information back. Statistics of different IoT machines and devices suggests that unexpected and abrupt failures are frequent and might represent as much as 50% of all the failures observed even for well-maintained devices with scheduled inspections, part replacement, and maintenance. Unexpected failures and unscheduled maintenance is expensive and, thus, reducing their number is of great importance to the device owners and operators.

IoT sensor data contains various information about different aspects of device operation, including device health. Sensors might measure device on/off status, location, velocity, temperature, and pressure of an engine and different components, etc. Some sensors could be directly measuring how close the device is to failure. Some other sensors are able to measure some critical degradation processes inside the device such as "oil degradation" or "remaining brake pad thickness" or qualitatively measure how well an IoT device is performing its intended job (i.e. performance).

All of the above information could be used to perform an assessment of device's health and there are two general ways of doing that: with the knowledge of the device, its reliability and failure mechanisms, design, and operational requirements, and without that knowledge. The first approach relies on the knowledge of how device works and how it fails. For example, if it is known that exceeding a specific temperature or pressure leads to the device failure, it is possible to monitor IoT sensor data from device's temperature or pressure sensors and, if the pre-specified limit is exceeded, report the "failure condition" or alert the owner/operator of the device of the impending failure. The same approach could be implemented in some combination with, for example, mathematical or empirical models of this device when the sensor data is fed into the model which, in turn, makes predictions about device's remaining life or its failure risks. While the above approach could work well in many cases, it requires complete knowledge of how device works and how it fails, which may not be available.

In addition to statistical processes, machine learning processes are useful for IoT device monitoring and evaluation. Machine learning is a sub-field of Artificial Intelligence (AI) and refers to algorithms and software that gets better at its analysis and predictions with experience, e.g. with more time spent on "learning" and with more data having been analyzed. Machine learning has the ability to not only evaluate sensor data, but to discern data patterns and changes in data patterns. Patterns relate to sensor behavior over a period of time. If a pattern repeats with only minor variation it may be interpreted as reflecting normal behavior, while if a pattern repeats with major variation it may be interpreted as reflecting abnormal or anomalous behavior. Machine learning is now being relied upon heavily in Big Data Analytics and, in particular, in analytics for the IoT. Anomaly detection is a process or algorithm by which raw data points are taken in, and reports are made at the timestamps where unusual behavior in the data is observed.

Referring now to FIG. 1, a block diagram illustrating components of an IoT Device Health Evaluation System 100 in accordance with a first embodiment of the present invention is shown. IoT device health evaluation system 100 includes an IoT device 104 and an IoT health evaluation device 112.

IoT device 104 is an Internet of Things device with at least one network connection. IoT is the inter-networking of physical devices, vehicles (also referred to as "connected devices" and "smart devices"), buildings, and other items—embedded with electronics, software, sensors, actuators, and network connectivity that enable these objects to collect and exchange data. In 2013 the Global Standards Initiative on Internet of Things (IoT-GSI) defined the IoT as "the infrastructure of the information society". The IoT allows objects to be sensed and/or controlled remotely across existing network infrastructure, creating opportunities for more direct integration of the physical world into computer-based systems, and resulting in improved efficiency, accuracy and economic benefit in addition to reduced human intervention. When IoT is augmented with sensors and actuators, the technology becomes an instance of a more general class of cyber-physical systems, which also encompasses technologies such as smart grids, smart homes, intelligent transportation and smart cities. Each "thing" is uniquely identifiable through its embedded computing system but is able to interoperate within the existing Internet infrastructure. Experts estimate that the IoT will consist of almost 50 billion objects by 2020.

Typically, IoT is expected to offer advanced connectivity of devices, systems, and services that goes beyond machine-to-machine (M2M) communications and covers a variety of protocols, domains, and applications. The interconnection of these embedded devices (including smart objects), is expected to usher in automation in nearly all fields, while also enabling advanced applications like a smart grid, and expanding to areas such as smart cities. "Things," in the IoT sense, can refer to a wide variety of devices such as heart monitoring implants, biochip transponders on farm animals, electric clams in coastal waters, automobiles with built-in sensors, DNA analysis devices for environmental/food/pathogen monitoring or field operation devices that assist firefighters in search and rescue operations. These devices collect useful data with the help of various existing technologies and then autonomously flow the data between other devices. Current market examples include home automation (also known as smart home devices) such as the control and automation of lighting, heating (like smart thermostat), ventilation, air conditioning (HVAC) systems, and appliances such as washer/dryers, robotic vacuums, air purifiers, ovens or refrigerators/freezers that use Wi-Fi for remote monitoring.

In addition to whatever core functionality and IoT device 104 has, in most embodiments IoT devices 104 includes one or more sensors 108. Sensors 108 monitor specific functions of IoT device 104 in order to allow an outside device (IoT health evaluation device 112) to make an independent judgment of a level of operability or health of the IoT device 104. IoT devices 104 may have many different sensors 108, each measuring a different aspect of IoT device 104 reliability or performance. FIG. 1 illustrates an IoT device 104 with eight sensors, identified as sensor 1 108A through sensor 8 108H. The present invention assumes that IoT device 104 includes at least one sensor 108. Each sensor 108 has a corresponding sensor output 120.

Sensor outputs 120 may be monitored in several different ways. Sensor outputs 120 may produce data on a random basis, semi-regularly, or periodically. Random sensor data may be produced at any time. Semi-regular sensor data may be produced with some regularity (for example once per day), but may not be predictably produced (for example at a random time each day). Periodic sensor data is produced with constant time differences between each data item. Sensor data may be produced as a batch of data from a sensor—so that a single sensor output 120 event may contain multiple data points. In lieu of an IoT device 104 producing sensor data on a random, semi-regular, or periodic basis, an IoT health evaluation device 112 may instead poll one or more sensor outputs 120 randomly or periodically. An IoT device 104 may also stream data to the IoT health evaluation device 112. In some embodiments, an IoT device 104 may be configured to produce sensor data at a frequency, batch, or other timed parameter to the IoT health evaluation device 112.

Sensor outputs 120 are connected to an IoT health evaluation device 112, which is generally a computer or other device able to interface with sensor outputs 120, store sensor output data, evaluate sensor output data, and determine an output sensor health status 116 for each sensor output 120. Sensor health status 116 may be provided to another computer, a user, or transmitted to one or more IoT devices 104 for various purposes. For the embodiment illustrated in FIG. 1, each sensor 108, sensor output 120, and sensor health status 116 is evaluated independently of all other sensors 108 sensor outputs 120, and sensor health statuses 116.

Referring now to FIG. 2, a block diagram illustrating components of an IoT Device Health Evaluation System 200 in accordance with a second embodiment of the present invention is shown. IoT device 104 includes multiple sensors 108, identified as sensor 1 108A through sensor n 108N.

IoT device health evaluation system 200 includes the same components illustrated in FIG. 1, but provides a blended health status 204 from the IoT health evaluation device 112 instead of independent health statuses for each sensor 108. Processes described herein include processes to generate a blended health status 204 from a plurality of sensors 108A-N and sensor outputs 120A-N.

Referring now to FIG. 3, a block diagram illustrating components of an IoT Device Health Evaluation System 300 in accordance with a third embodiment of the present invention is shown. IoT device 104 includes multiple sensors 108, identified as sensor 1 108C through sensor 8 108H. In addition to multiple sensors 108, sensors are grouped into two or more Groups 304. Groups 304 may be helpful to define where different forms of sensor functionality are present. For example, one group 304 of sensors 108 may be related to engine performance (temperatures, pressures, flow rates, and so on). Another group 304 of sensors 108 may be related to atmospheric conditions (temperature, wind strength and direction, overcast conditions, etc.). Yet another group 304 of sensors 108 may be related to work output of an IoT device 104 (amount of material handled, rejected, or identified for future attention).

In the illustrated embodiment, IoT device 104 has three Groups 304, identified as group A 304A, group B 304B, and group C 304C. Group A 304A includes sensor 1 108A, sensor 2 108B, and sensor 3 108C. Group B 304B includes sensor 4 108D and sensor 5 108E. Group C 304C includes sensor 6 108F, sensor 7 108G, and sensor 8 108H. Each group includes at least one sensor 108.

Unlike the embodiments shown in FIGS. 1 and 2, the embodiment illustrated in FIG. 3 produces one independent blended health status 308 for each group 304. IoT health evaluation device 112 produces group A health status 308A, group B health status 308B, and group C health status 308C. Although the embodiment illustrated in FIG. 3 shows each sensor 108 in a specific group 304, it should be understood that a given sensor 108 may be in more than one group 304, and some sensors 108 may be in one or more groups 304 while other sensors 108 may not be in a group 304. Additionally, some or all of the group health status outputs 308 may be combined into one or more unified blended health statuses 204.

Referring now to FIG. 4, a block diagram illustrating components of an IoT Health Evaluation Device 112 in accordance with embodiments of the present invention is shown. IoT health evaluation device 112 is generally a computer of some sort, including a server, desktop computer, mobile computer, or wearable computer.

IoT health evaluation device 112 includes one or more processors 404, which execute computer-readable instructions of the present invention. Processors 404 may include x86 processors, RISC processors, embedded processors, other types of processors, FPGAs, programmable logic, or pure hardware devices.

Processor 404 interfaces with memory 408, which stores metadata 412, applications 416, and/or sensor data 420. Metadata 412 includes data structures and parameters used in the processes of the present invention. Applications 416 includes computer-readable instructions including instructions for processes of the present invention. Sensor data 420 is data from sensor outputs 120. Memory 408 may include any combination of volatile and non-volatile memory.

In some embodiments, IoT health evaluation device 112 interfaces with one or more external databases (not shown) that may provide increased storage for any of metadata 412, applications 416, or sensor data 420. In some embodiments, IoT health evaluation device 112 may utilize stateless processing or in-memory processing and not store older sensor data than the most recently received sensor data. In that case, the IoT health evaluation device 112 will need to maintain running statistics as new data is received as well as other "summary" statistics such as the number of sensor data samples received.

IoT health evaluation device 112 may optionally include one or more timers 436, a keyboard or pointing device 440, and a display 444. Timers 436 may alternatively be present within processors 404 or implemented in software within applications 416. A keyboard or pointing device 440 and display 444 are required if the IoT health evaluation device 112 directly interfaces with a user. Otherwise, they may not be required.

IoT health evaluation device 112 receives sensor outputs 120 through a sensor receiver 432. The sensor receiver 432 may be conditioned to sample sensor outputs 120 at regular intervals or operate in a batch or an event-driven basis. Once sensor outputs 120 have been received, they are stored as sensor data 420 and the memory 408 or in some other database. In some embodiments, sensor data from sensor outputs 120 is received through network transceiver 424 instead.

Finally, the IoT health evaluation device 112 may include one or more network transceivers 424, which connects to a network 428 through network connections 448. Network transceiver 424 is generally the means through which IoT health evaluation device 112 reports sensor health statuses 116 or blended health statuses 204, 308 to another computer or user. However, in some embodiments the sensor health statuses 116 and blended health indexes/statuses 204, 308 are displayed 444 in lieu of transmitting to another computer on the network 428.

Referring now to FIG. 5, a diagram illustrating Sensor Data Logging in accordance with exemplary embodiments of the present invention is shown. IoT health evaluation device 112 monitors sensor outputs 120 from each monitored sensor 108 of an IoT device 104. Each monitored sensor 108 produces values 504 over time 508. The range of values 504 is determined by characteristics of the corresponding sensor 108, and a generalized range of value=1 through value=4 is shown for exemplary purposes. However, the range of values 504 for any sensor 108 may be any numerical values. Data values 504 may be received regularly or randomly.

The time 508 corresponding to a value of 0 signifies a start of a training phase 512 for each corresponding sensor 108. The training phase 512 includes a minimum of three data values 504 for each sensor 108, and there may not be a specific maximum or predetermined number of data values 504 that must be included in the training phase 512. At least three values 504 must be received during the training phase 512 in order to produce meaningful statistics for IoT device 104 health. In some embodiments, a predetermined time 508 determines the length of the training phase 512, as long as at least three samples or values 504 have been received. In other embodiments, a minimum number of values 504 must be received during the training phase 512. In general, the longer the training phase 512 is and the more values 504 received, the more accurate predictions for the IoT device 104 will be. The goal of the training phase 512 for each sensor 108 is to generate a statistical baseline for what could be considered as "normal" before initiating an operating or operational phase 516.

Once the training phase 512 criteria has been met, sensor data logging for the corresponding sensor 108 transitions to the operating phase 516. Operating phase 516 is the time period during which an IoT health evaluation device 112 generates sensor health statuses 116, blended health status 204, or group health statuses 308. In some embodiments, all sensors 108 for an IoT device 104 transition to operating phase 516 at the same time 508. In other embodiments, different sensors 108 or groups of sensors 304 of an IoT device 104 transition to operating phase 516 at different times 508.

When each sensor value 504 is received at a specific time 508, metadata 412 is stored by IoT health evaluation device 112. Therefore, in some embodiments a table in metadata 412 similar to the table shown in FIG. 5 is stored for each sensor 108. In addition to the value 504 and timestamp 508, an ID 528 for the corresponding sensor 108 and an ID 524 for the corresponding IoT device 104 is stored. In one embodiment, an unlimited number of sensor values 504 and timestamps 508 are stored. In other embodiments, a predetermined number of sensor values 504 and timestamps 508 are stored. In general, a larger number of stored sensor values 504 and timestamps 508 are preferred. However, data storage limitations in the system 100, 200, 300 may limit how many data points are able to be stored. For embodiments that store a limited number of data values 504 and timestamps 508, only the most recent data values 504 and timestamps 508 are stored and older values 504 and timestamps 508 are discarded.

An example of the result of an anomaly detection algorithm such as may be performed by one or more applications 416 of an IoT health evaluation device 112 is illustrated in FIGS. 8A and 8B. An anomaly detector uses and stores historical sensor data, which is then used in the processing and detection of anomalies. For each of the time scales selected in the configuration phase (block 916 of FIG. 9), the number of anomalies that result from processing the raw data with any anomaly detector is accumulated for each of the time scales, for example a rolling window 832 in FIG. 8A. At least three anomaly data values (i.e., anomaly counts from three time periods for a particular time scale), and preferably more, are required in order to calculate an initial baseline of anomaly counts for each time scale. More data values 504 may be required to calculate the initial baseline in other embodiments as described previously. Preferably, the initial baseline is at least comparable to the time between typical failures, if that is known. However, if the time between typical failures is a long period of time, for example a year, it may not be practical to gather data for an initial baseline for that long of time. Once the initial baseline has been calculated, the next data point becomes a first operational phase data point 536, the data point after that becomes a second operational phase data point 540, and so on.

Under some conditions, the IoT health evaluation device 112 may elect to disqualify certain incoming sensor data 504. In some embodiments, disqualify means not storing the incoming data 504. In other embodiments, disqualify means not including the data 504 into either calculating a current baseline 532 or an updated baseline. In yet other embodiments, disqualify means not evaluating the disqualified data 504 against an updated baseline. Data 504 may be disqualified for many reasons, including but not limited to receiving data 504 either too soon or too late after previous data 504 or a data value 504 known to be an out of range value for a corresponding sensor 108.

Referring now to FIG. 6, a diagram illustrating an Anomaly Detection Example Using Statistical Outlier Discovery in accordance with embodiments of the present invention is shown. FIG. 6 shows statistical process control (SPC) analytical techniques applied to analysis of incoming sensor data 504. FIG. 5 illustrates the data capture and storage process for data 504 from each sensor 108. Once the data 504 has been stored, the IoT health evaluation device 112 calculates statistics for the corresponding sensor 108. Therefore, in some embodiments a table similar to that shown in FIG. 6 is stored in metadata 412 for each sensor 108, sensor group 304, and IoT device 104. Using the data shown in FIG. 5, the exemplary graph in FIG. 6 shows the data values 504 in the training phase 512 and operating phase 516, with the mean 604, +3 Sigma 612, and −3 Sigma 616 also displayed.

As an example of an anomaly detection algorithm we present a basic approach from statistics. In statistics, the so-called three-sigma rule of thumb expresses a conventional heuristic that nearly all values are taken to lie within three standard deviations of the mean, i.e. that it is empirically useful to treat 99.7% probability as near certainty. The usefulness of this heuristic depends significantly on the question under consideration, and there are other conventions, e.g. in the social sciences a result may be considered "significant" if its confidence level is of the order of a two-sigma effect (95%), while in particle physics, there is a convention of a five-sigma effect (99.99994% confidence) being required to qualify as a "discovery". The three sigma rule of thumb is related to a result also known as the three-sigma rule, which states that even for non-normally distributed variables, at least 88.8% of cases should fall within properly-calculated three-sigma intervals.

In one embodiment, namely, the embodiment recited in the immediately previous paragraph, the IoT health evaluation device 112 calculates a mean value or average 604, a Sigma value 608, a + three Sigma value 612, and a − three Sigma value 616. In the preferred embodiment, the Sigma value 608 represents a 3 Sigma standard deviation, the plus Sigma value 612 represents a +3 Sigma standard deviation, and the minus Sigma value 616 represents a −3 Sigma value 616. However, it should be understood that the Sigma 608, plus Sigma 612, and minus Sigma 616 values may be any values that produce the desired statistical analysis. The plus Sigma 612 calculation establishes an upper bound for the corresponding sensor 108, sensor group 304, or IoT device 104. The minus Sigma 616 calculation establishes a lower bound for the corresponding sensor 108, sensor group 304, or IoT device 104, as well. Data values 504 below the plus Sigma value 612 and above the minus Sigma value 616 are interpreted as being normal or "green" results 620. Data values 504 above the plus Sigma value 612 or below the minus Sigma value 616 are interpreted as being anomalous or "yellow" results. Data values 504 equal to the plus Sigma value 612 or the minus Sigma value 616 may be determined to be either normal/green or anomalous/yellow results, depending on desired interpretation. In the embodiment illustrated in FIG. 6, all results meet the normal/green criteria and no results are anomalous/yellow.

In addition to statistical anomaly detection techniques including statistical process control (SPC), other analytical techniques may be used to evaluate sensor data for anomalies. For any time scale, other statistical techniques including single variable 3*sigma outliers, use of Mahalanobis metricsdistance, Z-score/weighted Z-score, and other techniques may be used. Model-based approaches (when some sort of assumption about the data is made) include Robust covariance estimation, Subspace-based anomaly detection, Kernel-based density estimation, and other model-based techniques. Unsupervised machine learning approaches may also be used, including K-means-based approaches, dbscan (finds contiguous regions of common density), Isolation forest, One-class support vector machines, and other techniques.

Referring now to FIG. 7, a diagram illustrating an Anomaly Detection Example Using Normal 716, Anomalous 712/720, and Failure 724 instances in accordance with embodiments of the present invention is shown. In some embodiments, no failure limits, failure data, or failure history for corresponding sensor 108 may be available. In that case, only normal/green 716 or anomalous/yellow 712, 720 results are produced. In other embodiments, failure limits, failure data, or failure history for corresponding sensors 108 may be available. For example, it may be known that a given sensor 108 may produce sensor outputs 120 with a maximum or minimum value reflecting expected damage to the corresponding IoT device 104. In that case, the maximum or minimum values are stored in the metadata 412 for the corresponding sensor 108 and compared with data values 504 to determine when the corresponding sensor 108 has a failure/"red" value 724. Data values 504 above a high failure value 708 or below a low failure value 704 are interpreted as being failed or "red" results. Data values 504 equal to the high failure value 708 or the low failure value 704 may be determined to be either anomalous/yellow 712, 720 results or failed/red results 724, depending on desired interpretation. In the embodiment illustrated in FIG. 7, two results 712, 720 meet the anomalous/yellow criteria and one result 724 meets the failed/red criteria.

Referring now to FIG. 8A, a diagram illustrating Time Scales for Statistical Comparison of Current Anomaly Counts vs. Historical Anomaly Counts in accordance with embodiments of the present invention is shown. The present invention uses one or more time scales to evaluate statistical data. FIGS. 6 and 7 illustrates embodiments where only an instantaneous timescale 804 is considered (i.e. only evaluated at the current time 824 when a new data value 504 is received). When a data value 504 is received, the mean 604 and Sigma values 612, 616 are immediately calculated and used to determine anomalies, and a result (normal/green 716, anomalous/yellow 712/720, or failure/red 724) is produced for the data value 504. Graph 804 (A) shows an example where a fluctuating range of values is generally between upper and lower limits (plus three Sigma 612 and minus three Sigma 616, for example), and occasionally above or below the upper or lower limits of the raw sensor data 840. The limit values shown may represent abnormal/yellow data values 712, 720 or failure/red data values 724.

There is value in using multiple time scales to evaluate IoT device 104 health. Abnormal or failure indication from sensor outputs 120 may be related to a usage pattern that is time-related to an IoT device 104. For example, an IoT device 104 may be busier at some time of the day or some days of the week more than others. An IoT device 104 may fail more often during midday temperatures (12 PM to 6 PM, for example) when ambient temperatures are likely higher. In one embodiment, an IoT health evaluation device 112 evaluates data instantaneously 804, and if there is an indication of anomalous/yellow 712, 720 behavior another time scale such as the previous hour 808 is used to validate the anomalous/yellow 712, 720 behavior. This is shown in more detail with respect to FIGS. 11 and 12.

Graph B 808 of FIG. 8A illustrates a time scale 852 with a rolling window 832 of a previous hour. The rolling window 832 is measured back from the current time 824 to one hour before the current time 828. Although a rolling window 832 of one hour is illustrated, any time period may be used for a rolling window 832. Graph 808 (B) shows an example where a fluctuating range of anomaly count values 848 is generally between upper and lower limits (plus three Sigma 612 and minus three Sigma 616, for example), and occasionally above or below the upper 612 or lower 616 limits; these excursions beyond upper 612 or lower 616 limits are then accumulated into an anomaly count 848 for that time period 836 (rolling window 832, in this case). It should be noted that if current time 824 back to the beginning of the training phase 512 is less than an hour, the rolling window 832 will not reflect an hour of time. The limit values shown may represent anomalous values of anomaly counts 848 (contributing to a yellow 712, 720 status if the anomaly count 848 is unusual) or failure/red values 724.

FIG. 8B is a diagram illustrating Time Scales for Statistical Comparison of Current Anomaly Counts vs. Historical Anomaly Counts in accordance with embodiments of the present invention. Graph C 812 illustrates an exemplary time scale 856 with fixed three-hour daily blocks. For example, the clock time of 12 AM to 3 AM would be a first time period 836, the clock time of 3 AM to 6 AM would be a second time period 836, the clock time of 6 AM to 9 AM would be a third time period 836, and so on. In this way, there would be eight equal three hour time blocks within each day of time. Graph C 812 shows no anomalous counts 848 between 12 AM to 3 AM, no anomalous counts 848 between 3 AM and 6 AM, one anomalous count 848 between 6 AM and 9 AM, no anomalous counts 848 between 9 AM and 12 PM, no anomalous counts 848 between 12 PM and 3 PM, no anomalous counts 848 between 3 PM and 6 PM, no anomalous counts 848 between 6 PM and 9 PM, and no anomalous counts 848 between 9 PM and 12 AM. Other embodiments based on fixed time blocks may be based on a different number of hours, minutes, morning/afternoon, or other delineations. The limit values shown may represent anomalous/yellow values 712, 720 or failure/red values 724.

Graph D 816 illustrates an exemplary time scale 860 based on days of the week, with no anomalous counts 848 received on Monday, no anomalous counts 848 received on Tuesday, one anomalous count 848 received on Wednesday, no anomalous counts 848 received on Thursday, no anomalous counts 848 received on Friday, and no anomalous counts 848 received on Saturday. Although monitoring for Sundays is not shown in this embodiment, in other embodiments it may be tracked as well as other weekdays. Other embodiments may be based on weekdays or weekends, include holidays, or organize days of the week 816 into other categories. The limit values shown may represent anomalous/yellow values 712, 720 or failure/red values 724.

Group E 820 illustrates an exemplary time scale 864 based on weeks of the year, with 52 weekly periods normally tracked. Group E 820 shows most anomalous counts 848 as being normal/green anomalous counts 712, 720, with one anomalous count 848 above an upper limit 612 and one data value 504 on a lower limit 616. This type of time scale 864 may be more valuable in showing relationships to seasonal or other longer-term trends. The limit values shown may represent anomalous/yellow values 712, 720 or failure/red values 724.

Referring now to FIG. 9, a flowchart illustrating a Configuration process in accordance with embodiments of the present invention is shown. The configuration process is generally run one time for each monitored IoT device 104. Flow begins at block 904 and Optional block 908.

At block 904, IoT devices 104 and available sensors 108 and sensor outputs 120 are uniquely identified. Each IoT device 104 may have multiple sensors 108 and sensor outputs 120. Also, it may not be necessary to include certain sensors 108 and sensor outputs 120 into the evaluation process if it is known that those sensors 108 and sensor outputs 120 have minimal or no contribution to predicted reliability or performance degradation of the IoT device 104. Flow proceeds to block 912.

At Optional block 908, if there is a failure data or failure history available, it is usually determined at this time and incorporated into the processes of the present invention is described herein. However, this is not a requirement for the present invention although it does contribute to the quality of results obtained. For example, knowing failure data or failure history in advance may produce a more accurate prediction of upcoming failure if the data values 504 are approaching the identified failure limits. Flow proceeds to block 912.

At block 912, the type of sensor 108 evaluation performed by the IoT health evaluation device 112 is determined. Sensor outputs 120 may be evaluated individually, blended, or grouped, or in combination as described with reference to FIGS. 1-3. Individual evaluation produces a unique sensor health status 116 result for each sensor 108, is shown and described with reference to FIG. 1. A blended evaluation produces a blended sensor health status 204 based on all sensors 108 from an IoT device 104, as shown and described with reference to FIG. 2. A grouped evaluation produces a unique group health status 308 for each defined group 304. In some embodiments, a blended sensor health status 204 may additionally be created from all group health statuses 308. Flow proceeds to block 916.

At block 916, the time scales 808-820 to be used for evaluation are identified. Time scales 808-820 may include instantaneous 804, rolling windows 808, daily blocks of time 812, days of the week 816, weeks of the year 820, or any other time scale that may be contemplated. Different collections of time scales 808-820 may be used for different IoT devices 104, different sensor groups 304, or even different sensors 108. Flow proceeds to block 920.

At block 920, the length of the training phase 512 for each sensor 108, group 304, or IoT device 104 is defined. All training phases thus defined 512 each have the least three data values 504 in length, regardless of the length of time 508 it takes to receive the three data values 504. Some training phases 512 may be measured in a minimum number of data values 504 received by the IoT health evaluation device 112, while other training phases 512 may be measured by a minimum length of time 508. Flow ends at block 920.

Referring now to FIG. 10, a flowchart illustrating a Per-Time Scale Training Phase 512 process for Anomalous Counts 848 in accordance with embodiments of the present invention is shown. Anomalous counts 848 are based on anomalous events, such as events 712 or 720 in FIG. 7. Once all sensors 108, groups 304, and IoT devices 104 have been configured per the process illustrated in FIG. 9, the training phase 512 may begin for each sensor 108, group 304, and for the IoT device 104 itself. Therefore, the process illustrated in FIG. 10 is performed for each sensor 108 and IoT device 104. Flow begins at block 1004.

At block 1004, the IoT health evaluation device 112 receives data 504 from sensors 108 of the IoT device 104. Flow proceeds to block 1008.

At block 1008, the IoT health evaluation device 112 stores the received data. In some embodiments, the received sensor data 420 is stored in a memory 408 of the IoT health evaluation device 112. In other embodiments, the received sensor data 420 is stored in a database part of or external to the IoT health evaluation device 112. In some embodiments, the amount of sensor data 420 able to be stored by the IoT health evaluation device 112 is limited, and in conjunction with storing the received data the oldest stored sensor data 420 is deleted. Flow proceeds to decision block 1012.

At decision block 1012, the IoT health evaluation device 112 determines if a predetermined amount of data 504 has been received. In one embodiment, the predetermined amount of data is three data values 504. In another embodiment, the predetermined amount of data is a number of data values 504 greater than three. In yet another embodiment, the predetermined amount of data is data received in a predetermined amount of time 508. If the predetermined amount of data has not been received, then flow proceeds to block 1004 to wait for new received data. If the predetermined amount of data has been received, then flow instead proceeds to block 1016.

At block 1016, a sufficient amount of data 504 has been received by the IoT health evaluation device 112 to create an initial baseline 532, and the initial baseline of anomaly counts per time scale 532 is created. In one embodiment, historical data for an anomaly detector is created by first determining the mean or average 604 and mean+/−standard deviation of the received data 504, and recording those anomalous events that occur outside of the mean+/−three sigma bounds (e.g. 712 in FIG. 7). Upper 612 and lower 612 anomalous limits are created from the received data 504 and the mean or average 604. Flow proceeds to block 1020.

At block 1020, the training phase 512 has been completed and the process transitions to the operating phase 516. The operating phase is shown in more detail in FIG. 11. Flow ends at block 1020.

Referring now to FIG. 11, a flowchart illustrating an Operating Phase process 1020 in accordance with embodiments of the present invention is shown. Because the process of FIG. 11 is a per-sensor 108 process, the process is repeated for each sensor 108 and sensor output 120. The process of FIG. 11 is also a per-IoT device 104 process, and would need to be repeated for each such IoT device 104 being monitored. Flow begins at block 1104.

At block 1104, the IoT health evaluation device 112 receives new data 504. Flow proceeds to block 1108.

At block 1108, the IoT health evaluation device 112 stores the received data 504. In some embodiments, the received sensor data 420 is stored in a memory 408 of the IoT health evaluation device 112. In other embodiments, the received sensor data 420 is stored in a database part of or external to the IoT health evaluation device 112. In some embodiments, the amount of sensor data 420 able to be stored by the IoT health evaluation device 112 is limited, and in conjunction with storing the received data 504 the oldest stored sensor data 420 is deleted. Flow proceeds to block 1112.

At block 1112, the relevant time scales 808-820 and time periods 836 for the new data 504 are identified. The new data 504 has an associated time stamp 508 identifying when the IoT health evaluation device 112 received the new data 504. Time scales 808-820 and time periods 836 are selected which include the time stamp 508 of the new data 504. For example, new data 504 having a time stamp 508 of 2 PM on a Thursday on May 23$^{rd}$ would have specific time periods 836 identified for each of time scales 812, 816, and 820. Flow proceeds to decision block 1116.

At decision block 1116, the IoT health evaluation device 112 determines if there are any known failure limits 704, 708 exceeded. Known failure limits 704, 708 are defined by failure data or failure history identified in optional block 908. Failure data or failure history may not be known for the IoT device 104 being monitored, or for some IoT devices 104 and not other IoT devices 104. If any known failure limits 704, 708 have been exceeded then flow proceeds to block 1120. If any known failure limits 704, 708 have not been exceeded, then flow instead proceeds to block 1124.

At block 1120, the current status 116 for the sensor 108 or IoT device 104 being monitored is failure/red 724. Identifying the current status as failure/red 724 alerts personnel that the corresponding sensor 108 or IoT device 104 is producing a sensor output 120 reflecting a known failure condition, and maintenance or replacement should be addressed as soon as possible. Flow proceeds to block 1104 to await new data 504.

At block 1124, known failure limits 704, 708 have not been exceeded, and statistically significant differences in the anomaly counts are evaluated for the time scales 808-820 identified in block 916. Therefore, since failure limits 704, 708 have not been exceeded the health status for the corresponding sensor 108 or IoT device 104 is either normal/green 716 or anomalous/yellow 712, 720. Updated anomaly count 848 limits are determined as the updated baseline. Flow proceeds to block 1128.

At block 1128, anomalies are detected in the raw data 504, using the +/−sigma technique detailed herein and updated in block 1124, or any of the other techniques mentioned previously. In the aforementioned embodiment, the number of raw data points occurring outside the +/−three sigma region 612, 616 from the mean 604 are recorded as anomalies and are used to update the baseline. Flow proceeds to decision block 1132.

At decision block 1132, the IoT health evaluation device 112 determines if there are anomalies found in the raw data 504. If there are anomalies found in the raw data 504 (i.e. anomaly counts 848 either at or above high limit 612 or at or below low limit 616), then flow proceeds to block 1140. If there are not anomalies found in the raw data 504, then flow instead proceeds to block 1136.

At block 1136, anomalies have not been found in the raw data 504, and the current status is normal or Green 716. Flow proceeds to block 1104 to wait for new data 504.

At block 1140, anomalies have been found in the raw data 504, and the IoT health evaluation device 112 evaluates statistically significant differences in anomaly counts for the time scales identified in block 916. The evaluation process for block 1140 is shown in more detail in FIG. 12. Depending on the evaluation process, the IoT device 104 health may be evaluated as either normal/Green 716 or anomalous/Yellow 712, 720. Flow proceeds to block 1104 to wait for new data 504.

Referring now to FIG. 12, a flowchart illustrating an Evaluate Time Scales and Time Periods process 1140 in accordance with embodiments of the present invention is shown. FIG. 12 illustrates an evaluation process using any number of time scales 808-820 that may be evaluated for each sensor 108, group 304, or IoT device 104. Flow begins at block 1204.

At block 1204, the evaluation process selects an initial time scale 808-820 to update. Flow proceeds to block 1208.

At block 1208, the evaluation process compares anomaly counts 848 to the updated baseline for the current time scale and time period 836. Flow proceeds to decision block 1212.

At decision block 1212, the IoT health evaluation device 112 determines whether the anomaly count 848 for the current time period 836 is statistically significant from the historical distribution of anomaly counts 848. In the example illustrated in FIGS. 6 and 7 where mean values and standard deviations are used, a statistically significant difference occurs when the received data results in an anomaly count 848 that is unusual for the time scale 808-820 and time period 836 under investigation. An anomaly does not occur when the anomaly is both less than the +3 Sigma value and greater than the −3 Sigma value for the distribution of anomalies at the current time scale 808-820. The anomalous counts are therefore determined for historically comparable time periods. Historically comparable time periods are previous time periods for the same reference within a time scale 808-820. For example, for a day of the week time scale 860, a historically comparable time period would be previous Tuesdays if the update or evaluation is being made during a current Tuesday.

If the received data value 504 is the same as or greater than either the +3 Sigma value 612 or the −3 Sigma value 616, this event increments the anomaly count 848, and with a sufficient number of such events may be interpreted as an anomalous/yellow 712, 720 result. If there is not a statistically significant difference in the number of anomalies for the selected time scale 808-820, then flow proceeds to block 1216. If there is a statistical significance in the number of anomalies for the selected time scale 808-820, then flow instead proceeds to decision block 1220.

At block 1216, the IoT health evaluation device 112 identifies the current status as normal/Green 716. Flow proceeds to block 1104 to receive new data 504 and to decision block 1304 to begin determination of a blended health index.

At decision block 1220, the IoT health evaluation device 112 determines if there are more time scales 808-820 to update. If there are more time scales 808-820 to update, then flow proceeds to block 1224. If there are not more time scales 808-820 to update, then flow instead proceeds to block 1228.

At block 1224, the IoT health evaluation device 112 has determined there are more time scales 808-820 to update, and selects a next time scale 808-820. Flow proceeds to block 1208 to compare anomaly counts 848 for the selected time scale 808-820.

At block 1228, the IoT health evaluation device 112 determines the anomaly counts 848 for the various sets of time scales 808-820 are statistically different from observed historical data and status anomalous/Yellow 712, 720 is reported. Flow proceeds to block 1104 to receive new data 504 and to decision block 1304 to begin determination of a blended health index.

Referring now to FIG. 13, a flowchart illustrating a Blended Device Health process in accordance with embodiments of the present invention is shown. A blended device health status 204 is a combination status derived from two or more sensors 108 or groups 304. FIG. 13 is entered following the determination that a current status is failed/red in block 1120, that the current status is normal/green in block 1216, or that the current status is anomalous/yellow in block 1228. Flow begins at decision block 1304.

At decision block 1304, the IoT health evaluation device 112 determines if all sensors 108 have been evaluated. If all sensors 108 have not been evaluated, then flow proceeds back to decision block 1304 until all sensors 108 have been evaluated. If all sensors 108 have been evaluated, then flow instead proceeds to decision block 1308.

At decision block 1308, the IoT health evaluation device 112 determines if the sensors 108 are in multiple groups 304. If the sensors 108 are in multiple groups 304, then flow proceeds to block 1332. If the sensors 108 are not in multiple groups 304 then either the sensors 108 are being evaluated individually as shown in FIG. 1 or the sensors 108 are combined into a unified blended health status 204 of FIG. 2, and flow instead proceeds to decision block 1312.

At decision block 1312, the IoT health evaluation device 112 determines if any of the sensors 108 have a failed/red status. If any of the sensors 108 have a failed/red status 724, then flow proceeds to block 1316. If none of the sensors 108 have a failed/red status 724, then flow instead proceeds to decision block 1320.

At block 1316, the IoT device 104 status is failed/red 724. Identifying the current status as failed/red 724 alerts personnel that the corresponding sensor 108 and device 104 is producing a sensor output 120 reflecting a known failure condition, and maintenance or replacement should be addressed as soon as possible. Flow ends at block 1316 or proceeds to block 1104 to await new sensor data 504.

At decision block 1320, the IoT health evaluation device 112 determines if any of the sensors 108 or the IoT device 104 has an anomalous/yellow status 712, 720. If any of the sensors 108 or the IoT device 104 has an anomalous/yellow status 712, 720, then flow proceeds to block 1324. If any the sensors 108 do not have an anomalous/yellow status 712, 720, then flow instead proceeds to block 1328.

At block 1324, the IoT device 104 status is anomalous/yellow 712, 724. Flow ends at block 1324 or proceeds to block 1104 to await new sensor data 504.

At block 1328, the IoT device 104 status is normal/green 716. Flow ends at block 1328 or proceeds to block 1104 to await new sensor data 504.

At block 1332, sensors 108 in multiple groups 304 have been identified, and a first group 304 is selected. Flow proceeds to decision block 1336.

At decision block 1336, the IoT health evaluation device 112 determines if any of the sensors 108 in the selected group 304 have a failed/red status 724. If any of the sensors 108 in the selected group 304 have a failed/red status 724, then flow proceeds to block 1340. If none of the sensors 108 in the selected group 304 have a failed/red status 724, then flow instead proceeds to decision block 1348.

At block 1340, at least one sensor 108 in the selected group 304 has a failed/red status 724, and the corresponding group health status 308 is identified as failed/red 724. Flow proceeds to block 1344.

At block 1344, a next group 304 is selected. Flow proceeds to decision block 1336.

At decision block 1348, the IoT health evaluation device 112 determines if any the sensors 108 in the selected group 304 have an anomalous/yellow status 712, 720. If any of the sensors 108 in the selected group 304 have an anomalous/yellow status 712, 720, then flow proceeds to block 1352. If none of the sensors 108 in the selected group 304 have an anomalous/yellow status 712, 720, then flow instead proceeds to block 1356.

At block 1352, at least one sensor 108 in the selected group 304 has an anomalous/yellow status 712, 720, and the corresponding group health status 308 is identified as anomalous/yellow 712, 720. Flow proceeds to decision block 1360.

At block 1356, no sensors 108 in the selected group 304 have an anomalous/yellow status 712, 720, and the corresponding group health status 308 is therefore identified as normal/green 716. Flow proceeds to decision block 1360.

At decision block 1360, the IoT health evaluation device 112 determines if there are more groups 304 to evaluate. If there are not more groups 304 to evaluate, then flow either ends or proceeds to block 1104 to wait for next receive data 504. If there are more groups 304 to evaluate, then flow proceeds to block 1364.

At block 1364, the IoT health evaluation device 112 selects a next group 304 to evaluate. Flow proceeds to decision block 1336.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel embodiment.

The descriptions and figures included herein depict specific embodiments to teach those skilled in the art how to make and use the best option. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A method for performing maintenance on a device, the method comprising:

receiving sensor data from a sensor monitoring the device during a current time scale;

creating, from a current anomaly count baseline and the sensor data, an updated anomaly count baseline comprising an updated anomaly count limit, the current time scale comprising a time period over which anomalies for the device are counted, the current anomaly count baseline established based on one or more historically relevant time scales related to the current time scale;

determining an anomaly count for the device from the sensor data for the current time scale, the anomaly count comprising a number of anomalies within the sensor data during the current time scale, wherein an anomaly comprises sensor data exceeding a statistical outlier limit;

comparing the anomaly count for the current time scale with the updated anomaly count limit of the updated anomaly count baseline;

classifying the device as having a first status in response to determining that any of the sensor data has exceeded the statistical outlier limit for the sensor;

classifying the device as having a second status in response to determining that the anomaly count of the current time scale is beyond the updated anomaly count limit; and performing maintenance or replacement of the device based on the classifying of the device, wherein a first maintenance action is performed in response to the device being classified as having the first status and a second maintenance action is performed in response to the device being classified as having the second status.

2. The method of claim 1, wherein the number of anomalies within the sensor data comprises a number of times sensor data of the current time scale exceeds a current sensor limit and further comprising:

creating the current sensor limit from sensor data of the current time scale and previous sensor data, wherein sensor data beyond the current sensor limit is a statistical anomaly of the sensor data and the previous sensor data; and comparing the sensor data of the current time scale with the current sensor limit to determine the anomaly count for the sensor data of the current time scale.

3. The method of claim 2, wherein creating the current sensor limit comprises:

determining a mean of the sensor data of the current time scale and the previous sensor data; and setting the current sensor limit as a specified amount from the mean, wherein the specified amount is determined using statistical outlier analysis such that sensor data beyond the current sensor limit is a statistical outlier compared with sensor data of the current time scale and the previous sensor data.

4. The method of claim 3, wherein the updated anomaly count limit of the updated anomaly count baseline and a current anomaly count limit of the current anomaly count baseline are created using the statistical outlier analysis and wherein the statistical outlier analysis for setting the current sensor limit, the updated anomaly count limit, and/or the current anomaly count limit comprises:

sigma analysis;

single variable 3*sigma outlier analysis;

standard deviation;

Mahalanobis distance;

Z-score weighted Z-score;

robust covariance estimation;

subspace-based anomaly detection; and/or kernel-based density estimation.

5. The method of claim 2, wherein the previous sensor data is from:

a rolling window of time;

a training period that occurs prior to an operational period, wherein the current time scale is after the training period; and one or more previous time scales.

6. The method of claim 5, wherein the training period comprises sensor data comprising at least three sensor readings.

7. The method of claim 1, wherein the one or more historically relevant time scales comprise:

a rolling window of one or more previous time scales occurring just prior to the current time scale;

a rolling amount of sensor data received just prior to the current time scale;

one or more previous time scales occurring during a similar period of activity for the device; and a training period.

8. The method of claim 1, wherein:

the current time scale comprises a period of time during an hour and the one or more historically relevant time scales comprise a same period of time during one or more previous hours;

the current time scale comprises a period of time during a day and the one or more historically relevant time scales comprise a same period of time during one or more previous days; and the current time scale comprises a period of time during a week and the one or more historically relevant time scales comprise a same period of time during one or more previous weeks.

9. The method of claim 1, wherein:

the sensor comprises a sensor of a plurality of sensors associated with the device and the sensor data comprises sensor data of the plurality of sensors; and the updated anomaly count baseline is created from the current anomaly count baseline derived from sensor data of the plurality of sensors and sensor data of the plurality of sensors for the current time scale.

10. The method of claim 9, wherein the anomaly count of the current time scale comprises anomalies from one of:

the sensor data of the plurality of sensors and classifying the anomaly count as anomalous is for the plurality of sensors; and the sensor data of a sensor of the plurality of sensors and classifying the anomaly count as anomalous is for the sensor of the plurality of sensors.

11. The method of claim 9, wherein the plurality of sensors comprises a group of related sensors.

12. The method of claim 1, further comprising determining that the device has an increased probability of failure or degraded performance in response to determining that a plurality of time scales comprise an anomaly count that is anomalous.

13. A program product comprising a non-transitory computer readable storage medium storing code, the code being configured to be executable by a processor to perform operations comprising:

establishing a current anomaly count baseline based on one more historically relevant time scales related to a current time scale;

operating a device during the current time scale to affect a physical condition measured by a sensor;

receiving sensor data from the sensor monitoring the device during the current time scale;

creating, from the current anomaly count baseline and the sensor data, an updated anomaly count baseline comprising an updated anomaly count limit, the current time scale comprising a time period over which the device is operated and anomalies for the device are counted;

determining an anomaly count for the device from the sensor data for the current time scale, the anomaly count comprising a number of anomalies within the sensor data during the current time scale, wherein an anomaly comprises sensor data exceeding a statistical outlier limit;

comparing the anomaly count for the current time scale with the updated anomaly count limit of the updated anomaly count baseline;

classifying the anomaly count of the current time scale as anomalous in response to determining that the anomaly count of the current time scale is beyond the updated anomaly count limit;

causing maintenance or replacement of the device in response to classifying the anomaly count for the device as anomalous; and continuing to operate the device to affect the physical condition measured by the sensor in response to classifying the anomaly count for the device as normal.

14. The program product of claim 13, wherein the number of anomalies within the sensor data comprises a number of times sensor data of the current time scale exceeds a current sensor limit and the operations further comprising:

creating the current sensor limit from sensor data of the current time scale and previous sensor data, wherein sensor data beyond the current sensor limit is a statistical anomaly of the sensor data and the previous sensor data; and comparing the sensor data of the current time scale with the current sensor limit to determine the anomaly count for the sensor data of the current time scale.

15. The program product of claim 14, wherein creating the current sensor limit comprises:

determining a mean of the sensor data of the current time scale and the previous sensor data; and setting the current sensor limit as a specified amount from the mean, wherein the specified amount is determined using statistical outlier analysis such that sensor data beyond the current sensor limit is a statistical outlier compared with sensor data of the current time scale and the previous sensor data, wherein the updated anomaly count limit of the updated anomaly count baseline and a current anomaly count limit of the current anomaly count baseline are created using the statistical outlier analysis.

16. The program product of claim 14, wherein the previous sensor data is from:

a rolling window of time;

a training period that occurs prior to an operational period, wherein the current time scale is after the training period; and one or more previous time scales.

17. The program product of claim 13, wherein one or more historically relevant time scales comprise:

a rolling window of one or more previous time scales occurring just prior to the current time scale;

a rolling amount of sensor data received just prior to the current time scale;

one or more previous time scales occurring during a similar period of activity for the device; and a training period.

18. The program product of claim 13, wherein:

the current time scale comprises a period of time during an hour and one or more historically relevant time scales comprise a same period of time during one or more previous hours;

the current time scale comprises a period of time during a day and the one or more historically relevant time scales comprise a same period of time during one or more previous days; and the current time scale comprises a period of time during a week and the one or more historically relevant time scales comprise a same period of time during one or more previous weeks.

19. A device comprising:

a processor; and non-transitory computer readable storage media storing code, the code being executable by the processor to perform operations comprising:

establishing a current anomaly count baseline based on one more historically relevant time scales related to a current time scale;

operating the device during the current time scale to affect a physical condition measured by a sensor;

receiving sensor data from the sensor monitoring the device during the current time scale;

creating, from the current anomaly count baseline and the sensor data, an updated anomaly count baseline comprising an updated anomaly count limit, the current time scale comprising a time period over which the device is operated and anomalies for the device are counted;

determining an anomaly count for the device from the sensor data for the current time scale, the anomaly count comprising a number of anomalies within the sensor data during the current time scale, wherein an anomaly comprises sensor data exceeding a statistical outlier limit;

comparing the anomaly count for the current time scale with the updated anomaly count limit of the updated anomaly count baseline;

classifying the anomaly count of the current time scale as anomalous in response to determining that the anomaly count of the current time scale is beyond the updated anomaly count limit;

causing maintenance or replacement of the device in response to classifying the anomaly count for the device as anomalous; and continuing to operate the device to affect the physical condition measured by the sensor in response to classifying the anomaly count for the device as normal.

20. The device of claim 19, wherein the number of anomalies within the sensor data comprises a number of times sensor data of the current time scale exceeds a current sensor limit and further comprising:

creating the current sensor limit from sensor data of the current time scale and previous sensor data, wherein sensor data beyond the current sensor limit is a statistical anomaly of the sensor data and the previous sensor data; and comparing the sensor data of the current time scale with the current sensor limit to determine the anomaly count for the sensor data of the current time scale.

* * * * *